(12) United States Patent
Zhuang et al.

(10) Patent No.: US 10,314,071 B2
(45) Date of Patent: Jun. 4, 2019

(54) DL COMP SCHEDULING FOR A HETEROGENEOUS CELLULAR NETWORK

(71) Applicant: Telefonaktiebolaget LM Ericsson (publ), Stockholm (SE)

(72) Inventors: Jiandong Zhuang, Nepean (CA); Xiaodong Shi, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/546,057

(22) PCT Filed: Feb. 5, 2015

(86) PCT No.: PCT/IB2015/050883
§ 371 (c)(1),
(2) Date: Jul. 25, 2017

(87) PCT Pub. No.: WO2016/124979
PCT Pub. Date: Aug. 11, 2016

(65) Prior Publication Data
US 2018/0020470 A1 Jan. 18, 2018

(51) Int. Cl.
*H04J 3/00* (2006.01)
*H04W 72/12* (2009.01)
(Continued)

(52) U.S. Cl.
CPC .......... *H04W 72/1278* (2013.01); *H04B 7/02* (2013.01); *H04W 16/02* (2013.01);
(Continued)

(58) Field of Classification Search
CPC ............. H04W 72/1278; H04W 16/02; H04W 72/0446; H04W 16/28
See application file for complete search history.

(56) References Cited

U.S. PATENT DOCUMENTS

2012/0087273 A1* 4/2012 Koo .................. H04B 7/024
370/252
2012/0176884 A1* 7/2012 Zhang ................ H04B 7/024
370/203
(Continued)

FOREIGN PATENT DOCUMENTS

EP    2590450 A1    5/2013
EP    2747478 A1    6/2014

OTHER PUBLICATIONS

Author Unknown, "Technical Specification Group Radio Access Network; Evolved Universal Terrestrial Radio Access (E-UTRA); Further advancements for E-UTRA physical layer aspects (Release 9)," Technical Report 36.814, Version 9.0.0, 3GPP Organizational Partners, Mar. 2010, 104 pages.
(Continued)

*Primary Examiner* — Chi H Pham
*Assistant Examiner* — Fahmida S Chowdhury
(74) *Attorney, Agent, or Firm* — Withrow & Terranova, PLLC

(57) ABSTRACT

A downlink Coordinated Multipoint (CoMP) scheduling algorithm used in a cellular communications network is disclosed. In some embodiments, a method of operation of a downlink scheduler (42, 46) implementing the disclosed algorithm for a generic cell (24, 30) is provided. The cell downlink scheduler (42, 46) is used in the cellular communications network (22) to enable downlink CoMP scheduling within a cell cluster (36) including the cell (24, 30) and one or more other cells (24, 30). According to at least some embodiments, the distributed downlink CoMP scheduling for the cell cluster (36) effectively reduces inter-cell co-channel interference.

31 Claims, 10 Drawing Sheets

(51) Int. Cl.
  *H04W 16/02* (2009.01)
  *H04W 72/04* (2009.01)
  *H04W 16/32* (2009.01)
  *H04B 7/02* (2018.01)
  *H04W 16/28* (2009.01)

(52) U.S. Cl.
  CPC ....... *H04W 16/32* (2013.01); *H04W 72/0426* (2013.01); *H04W 72/0446* (2013.01); *H04W 16/28* (2013.01)

(56) References Cited

U.S. PATENT DOCUMENTS

| | | |
|---|---|---|
| 2012/0182946 A1 | 7/2012 | Chen et al. |
| 2014/0211734 A1* | 7/2014 | Seo ............... H04J 11/0056 370/329 |
| 2014/0213269 A1* | 7/2014 | Nama ............. H04W 28/16 455/451 |
| 2014/0269502 A1* | 9/2014 | Forenza .......... H04B 17/12 370/328 |
| 2014/0348142 A1* | 11/2014 | Seo ............... H04L 5/0092 370/336 |
| 2015/0098415 A1* | 4/2015 | Chen .............. H04L 5/0035 370/329 |
| 2016/0309466 A1* | 10/2016 | Chen .............. H04B 7/2628 |

OTHER PUBLICATIONS

Author Unknown, "Technical Specification Group Radio Access Network; Coordinated multi-point operation for LTE physical layer aspects (Release 11)," Technical Report 36.819, Version 11.1.0, 3GPP Organizational Partners, Dec. 2011, 69 pages.

Intel Corporation (UK), "R1-110251: Coordinated multi-point schemes with centralized and distributed scheduling," 3rd Generation Partnership Project (3GPP), TSG-RAN WG1 #63bis, Jan. 16-22, 2011, 2 pages, Dublin, Ireland.

Kwan, Raymond et al., "Chapter 11: Downlink Resource Scheduling in an LTE System," in Fares, Salma Ait et al., eds., Mobile and Wireless Communications Physical Layer Development and Implementation (book), Jan. 1, 2010, InTech, pp. 189-208.

Li, Jian et al., "Resource Allocation Optimization for Delay-Sensitive Traffic in Fronthaul Constrained Cloud Radio Access Networks," IEEE Systems Journal, vol. PP, Issue 99, Nov. 5, 2014, IEEE, pp. 1-12.

Wang, Hu, "LTE-Advanced Development Progress," Presented at TTA IMT-Advanced Workshop, Sep. 11, 2009, Korea, Huawei Technologies Co., Ltd., 22 slides.

International Search Report and Written Opinion for International Patent Application No. PCT/IB2015/050883, dated Nov. 3, 2015, 11 pages.

* cited by examiner

DL COMP SCHEDULING FOR A HETEROGENEOUS CELLULAR NETWORK

This application is a 35 U.S.C. § 371 national phase filing of International Application No. PCT/IB2015/050883, filed Feb. 5, 2015, the disclosure of which is incorporated herein by reference in its entirety.

TECHNICAL FIELD

The present disclosure relates to downlink Coordinated Multipoint (CoMP) scheduling in a cellular communications network.

BACKGROUND

Co-channel interference is a serious technical issue in a heterogeneous $3^{rd}$ Generation Partnership Project (3GPP) Long Term Evolution (LTE) network, which may consist of many different types of service coverage such as macro cells, pico cells, and femto cells. Since all of these cells may use a single carrier, i.e. full frequency reuse, to communicate with User Equipment devices (UEs) served by the cells, the co-channel interference level in such a network could be considerably high and may become a bottle neck for sustaining cell throughputs at a certain level to meet required performance expectation, particularly for UEs on cell borders. This negative effect may significantly lower spectrum efficiency of a heterogeneous network.

As an advanced technical solution, Downlink (DL) Coordinated Multi-Point (CoMP) can play a role in combating co-channel interference by coordinating multi-cell operations in a cell cluster that provides a significant gain to bring back UE throughputs to meet required performance or even to reach a higher level. To achieve this goal, however, a specifically designed Media Access Controller (MAC) layer downlink scheduler is needed.

The existing situation is that DL CoMP technology is still in the phase of internal standardization and lab prototyping. Currently, DL CoMP related standardization is on its way and, as such, DL CoMP will soon be widely adopted and deployed in various heterogeneous networks worldwide. Thus, it is important, necessary, and valuable to a commercial enhanced or evolved Node B (eNB) product to be equipped with a smart downlink scheduler which is able to effectively and efficiently work with DL CoMP technology in a realistic heterogeneous networking environment.

SUMMARY

Systems and methods for providing distributed Downlink (DL) Coordinated Multipoint (CoMP) scheduling in a cellular communications network are disclosed. In some embodiments, a method of operation of a cell scheduler for a cell in a cellular communications network is provided. The cell scheduler is used in the cellular communications network to enable distributed DL CoMP scheduling for a cell cluster including the cell and one or more other cells. According to at least some embodiments, the distributed DL CoMP scheduling for the cell cluster reduces inter-cell co-channel interference.

In some embodiments, the method of operation of the cell scheduler comprises exchanging scheduling information with the one or more other cells comprised in the cell cluster for DL CoMP. Exchanging the scheduling information comprises sending, to the one or more other cells in the cell cluster for downlink CoMP, scheduling information that is indicative of resource blocks from a defined set of resource blocks that are scheduled, by initial downlink scheduling, for one or more wireless devices that are connected to the cell and associated with the cell cluster for downlink CoMP over a transmit time interval. Exchanging the scheduling information also comprises receiving, from each other cell in the cell cluster for downlink CoMP, scheduling information that is indicative of resource blocks from the defined set of resource blocks that are scheduled, by initial downlink scheduling, for one or more other wireless devices that are connected to the other cell and associated with the cell cluster for downlink CoMP over the transmit time interval. The method further comprises identifying a first subset of the defined set of resource blocks for a first DL CoMP transmission mode and a second subset of the defined set of resource blocks for a second DL CoMP transmission mode based on the scheduling information, where the first and second subsets are disjoint subsets.

In some embodiments, the first DL CoMP transmission mode is a Joint Processing/Joint Transmission (JP/JT) transmission mode and the second DL CoMP transmission mode is a Coordinated Scheduling/Coordinated Beamforming (CS/CB) transmission mode.

In some embodiments, identifying the first subset of the defined set of resource blocks for the first DL CoMP transmission mode and the second subset of the defined set of resource blocks for the second DL CoMP transmission mode comprises, for each resource block from the defined set of resource blocks, identifying the resource block as one of the first subset of the defined set of resource blocks if the resource block is also scheduled, by the initial downlink scheduling, for at least one wireless device that is connected to at least one of the one or more other cells in the cell cluster as indicated by the scheduling information.

In some embodiments, identifying the first subset of the defined set of resource blocks for the first DL CoMP transmission mode and the second subset of the defined set of resource blocks for the second DL CoMP transmission mode further comprises, for each resource block from the defined set of resource blocks, identifying the resource block as one of the second subset of the defined set of resource blocks if the resource block is not also scheduled, by the initial downlink scheduling, for any wireless device that is connected to any of the one or more other cells in the cell cluster as indicated by the scheduling information.

In some embodiments, the cell is a small cell, the one or more other cells in the cell cluster for DL CoMP comprise a macro cell that is also comprised in another, overlapping cell cluster for DL CoMP, and identifying the first subset of the defined set of resource blocks for the first DL CoMP transmission mode and the second subset of the defined set of resource blocks for the second DL CoMP transmission mode further comprises removing, from the first and second subsets of the defined set of resource blocks, any resource block that is also scheduled for one or more wireless devices connected to the macro cell and associated with the other, overlapping cell cluster for DL CoMP.

In some embodiments, the first subset of the defined set of resource blocks comprises one or more of the defined set of resource blocks that are scheduled for wireless devices that are connected to and associated with two or more cells in the cell cluster.

In some embodiments, the cell is a small cell, the one or more other cells in the cell cluster for DL CoMP comprise a macro cell that is also comprised in another, overlapping cell cluster for DL CoMP, and the first subset of the defined set of resource blocks comprises one or more of the defined set of resource blocks that: (a) are scheduled for wireless devices that are connected to and associated with two or more cells in the cell cluster and (b) are not also scheduled for one or more wireless devices connected to the macro cell and associated with the other, overlapping cell cluster for DL CoMP.

In some embodiments, the cell is a small cell, the one or more other cells in the cell cluster for DL CoMP comprise a macro cell that is also comprised in another, overlapping cell cluster for DL CoMP, and the second subset of the defined set of scheduling resource blocks comprises one or more of the defined set of scheduling resource blocks that: (a) are not scheduled, by the initial downlink scheduling, for any wireless device that is connected to any of the one or more other cells in the cell cluster as indicated by the scheduling information and (b) are not scheduled for one or more wireless devices connected to the macro cell and associated with the other, overlapping cell cluster for DL CoMP.

In some embodiments, the cell is a small cell, the one or more other cells in the cell cluster for DL CoMP comprise a macro cell that is also comprised in another, overlapping cell cluster for DL CoMP, and any resource block from the defined set of resource blocks that is neither comprised in the first subset nor the second subset of the defined set of resource blocks, is not scheduled in the small cell for any wireless device connected to the small cell and associated with the cell cluster.

In some embodiments, the method further comprises for each wireless device of the one or more wireless devices connected to the cell and associated with the cell cluster for DL CoMP, setting a DL CoMP transmission mode for the wireless device to the first DL CoMP transmission mode for the resource blocks in the first subset of the defined set of resource blocks and setting the DL CoMP transmission mode for the wireless device to the second DL CoMP transmission mode for the resource blocks in the second subset of the defined set of resource blocks.

In some embodiments, the cell is a small cell, the one or more other cells in the cell cluster for DL CoMP comprise a macro cell that is also comprised in another, overlapping cell cluster for DL CoMP, and the method further comprises scheduling one or more resource blocks from the defined set of resource blocks that are neither in the first subset nor the second subset of the defined set of resource blocks for one or more wireless devices that are connected to the small cell but are not associated with any cell cluster.

In some embodiments, the cell is a macro cell. In other embodiments, the cell is a small cell, e.g., a micro cell, a pico cell, or a femto cell.

In some embodiments, the method further comprises performing the initial downlink scheduling according to a proportional fair scheduling scheme. In other embodiments, the method further comprises performing the initial downlink scheduling according to a modified maximum throughput scheduling scheme, the modified maximum throughput scheduling scheme being that in which throughput is maximized across the one or more wireless devices that are connected to the cell and associated with the cell cluster and the defined set of resource blocks available to the cell cluster.

In some embodiments, the cell is a macro cell where the macro cell is comprised in the cell cluster and another, overlapping cell cluster for DL CoMP, and the method further comprises performing the steps of exchanging scheduling information and identifying the first subset and the second subset of the defined set of resource blocks for the other, overlapping cell cluster.

In some embodiments, the cellular communications network is a heterogeneous cellular communications network, and the cell cluster consists of only small cells.

In some embodiments, the cellular communications network is a heterogeneous cellular communications network, and at least two of the cell and the one or more other cells are macro cells.

Embodiments of a base station of a cellular communications network are also disclosed. In some embodiments, the base station operates to provide distributed DL CoMP scheduling according to any of the embodiments disclosed herein.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In principle, most of existing solutions for Long Term Evolution (LTE) downlink scheduling are not designed to work with Downlink (DL) Coordinated Multipoint (CoMP). Thus, they cannot meet the requirements for reducing co-channel inter-cell interference in a heterogeneous networking environment, where the coordination over multiple different types of cells in downlink resource scheduling is needed and should be in place.

Figure 1:
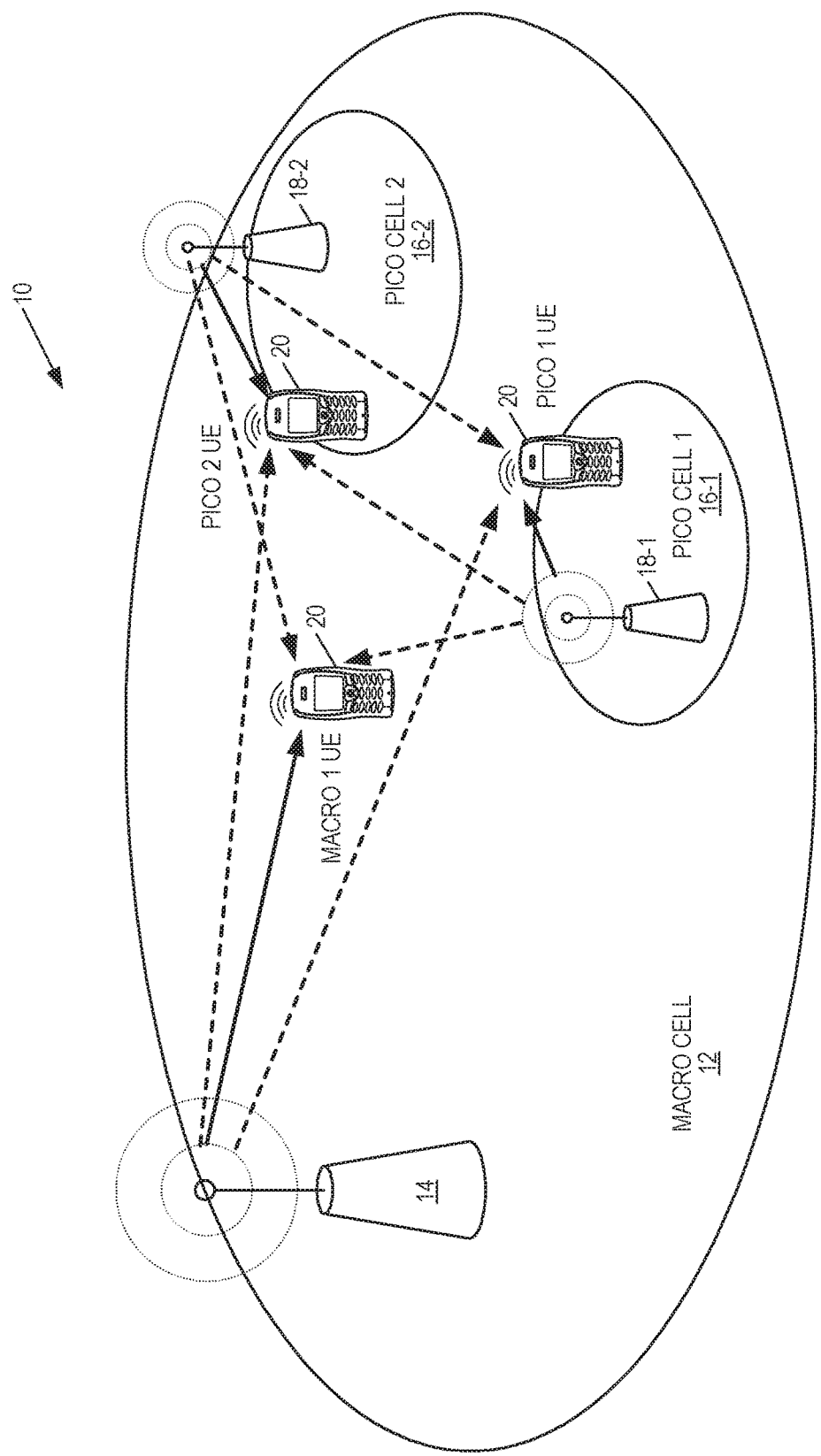
FIG. 1 illustrates co-channel interference in a heterogeneous cellular communications network.

The present disclosure relates to downlink scheduling for DL CoMP transmission in a multi-layer, or heterogeneous, cellular communications network. The downlink scheduling is such that inter-cell interference caused by co-channels is reduced. Before describing embodiments of the present disclosure, a discussion of a heterogeneous cellular communications network is beneficial. In this regard, FIG. 1 illustrates a heterogeneous cellular communications network 10 in which inter-cell co-channel interferences negatively impact cell and User Equipment device (UE) throughputs. In this example, the heterogeneous cellular communications network 10 includes a macro cell 12 controlled or served by a macro base station 14 and pico cells 16-1 and 16-2 (generally referred to as pico cells 16) controlled or served by corresponding pico base stations 18-1 and 18-2 (generally referred to herein as pico base stations 18). The pico cells 16 are distributed in the coverage area of the macro cell 12 to provide service (e.g., as hotspots). Notably, while pico cells 16 are used for the illustrations and descriptions provided herein, the discussion is not limited to pico cells 16; rather, the embodiments described herein are equally applicable to any type(s) of small cells (e.g., micro cells, pico cells, femto cells, etc.). For illustration purposes, only three UEs 20 are shown but, in reality, there may be many UEs 20.

The pico cells 16-1 and 16-2 are also referred to as Pico Cell 1 and Pico Cell 2, and the UEs 20 are also referred to as Macro UE (which is the UE 20 served by the macro cell 12), Pico1 UE (which is the UE 20 served by Pico Cell 1), and Pico2 UE (which is the UE 20 served by Pico Cell 2). The relationships between the UEs 20 and their serving cells 12, 16 are identified by corresponding solid lines with arrows pointing in the downlink direction, representing the downlink signals transmitted from the cell 12, 16 to their served UEs 20. The dotted lines in FIG. 1 represent inter-cell co-channel interferences, which are a group of by-products generated by each cell 12, 16 when sending a downlink signal to its served UE 20. It is assumed that all downlink signals are in collision due to being assigned the same frequency and/or time resource(s), which reflects the situation where the downlink schedulers of the cells 12, 16 are independent of each other in their operations. In such a circumstance, the co-channel interference is quite strong and, as a result, the Signal-to-Interference-plus-Noise Ratio (SINR) at the input of each UE's 20 receiver is decreased. The decreased SINR results in a considerable or even significant reduction in DL data throughput for each of the UEs 20 as well as each cell 12, 16 in the heterogeneous cellular communications network 10.

Since overlapping service coverage areas between cells 12, 16 is common or even preferred in a heterogeneous cellular communications network, the problem of inter-cell co-channel interferences is quite severe and becomes a major factor affecting network performance. Cell coordination, including downlink cell coordination and uplink cell coordination, is a key component in solving this problem. As a result, the general concepts and theories of CoMP processing have been developed and can be used as an advanced solution to combat inter-cell co-channel interferences. As discussed below, the present disclosure relates to downlink scheduling for DL CoMP that mitigates or reduces inter-cell co-channel interference.

According to $3^{rd}$ Generation Partnership Project (3GPP) (see, for example, 3GPP Technical Report (TR) 36.814 V9.0.0), DL CoMP has two main categories, namely, Joint Processing (JP) as well as Coordinated Scheduling and Coordinated Beamforming (CS/CB). In addition, JP can be further classified into two different schemes, namely, JP Joint Transmission (JP/JT) and JP Dynamic Cell Selection (JP/DCS). The common property of the both is that data for a UE is available at every transmission node (i.e., every radio base station) in a CoMP cooperating set. With respect to DL CoMP, a CoMP cooperating set is a set of UEs associated with a set of geographically separated transmission nodes which directly or indirectly participate in data traffic transmission to the UEs. In contrast to the JP, the CS/CB requires data sent to a UE to be available only at the UE's serving node.

For the JP/JT scheme, data is transmitted simultaneously from multiple transmission nodes at a time, thereby providing improved receiving signal strength and quality for targeted UEs due to the fact that specially designed multiple downlink data signals are constructively combined and enhance each other while undesired co-channel interferences are destructively combined and cancel each other over the air. Therefore, JP/JT DL CoMP requires a same portion of frequency and time resources to be allocated to all targeted UEs in a CoMP cooperating set.

For the CS/CB scheme, data is transmitted to a UE only from the transmitting node currently serving the UE and the transmission is performed by the serving node all the time during the service until the UE is handed over to another serving node due to its mobility. Therefore, the CS/CB scheme requires different portions of frequency and time resources to be exclusively allocated to different targeted UEs associated with a CoMP cooperating set. The frequency and time resources cannot be shared by other UEs.

In theory, downlink coordination across the entire network should be able to provide the best throughput gain for the network. But in reality, it is not implementable for a realistic network due to various practical issues such as backhaul capacity, signaling overhead, and implementation complexity. As an alternative, it is widely accepted by the industry that the coordination should be performed over a cluster of adjacent cells and UEs, which is referred to as a CoMP cooperating set as mentioned earlier. Therefore, the first issue for downlink coordination is to design and develop an effective and efficient multi-cell clustering algorithm so as to select targeted cells and UEs for each cluster over which DL CoMP can operate. Obviously, there is no doubt that this clustering algorithm plays a significant role in making coordinated downlink scheduling practically feasible and implementable for a realistic network. However, it is not the task of the present disclosure to develop such an algorithm. In fact, one such algorithm is described in commonly owned and assigned U.S. patent application Ser. No. 14/049,814, entitled DYNAMIC MULTI-CELL CLUSTERING FOR DOWNLINK COMP IN A WIRELESS COMMUNICATION NETWORK, filed Oct. 9, 2013, now U.S. Pat. No. 9,344,159, which is incorporated herein by reference for the teachings of multi-cell clustering related to DL CoMP scheduling. Thus, it is assumed that the clusters of cells and UEs required for the embodiments of the coordinated downlink scheduling algorithm for DL CoMP described herein are formed by, e.g., the algorithm described in U.S. Pat. No. 9,344,159.

Figure 2:
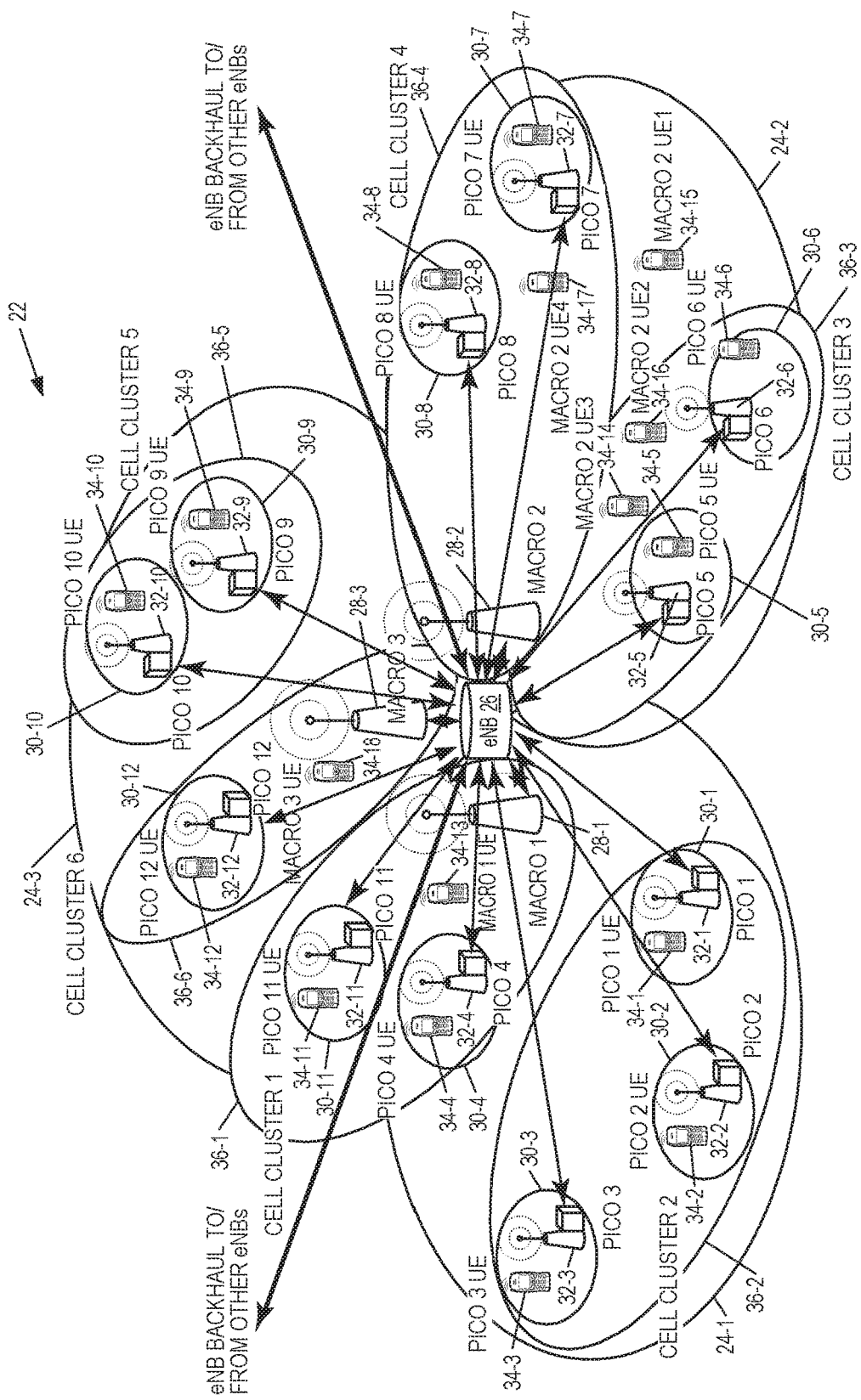
FIG. 2 illustrates a heterogeneous cellular communications network in which a distributed Downlink (DL) Coordinated Multipoint (CoMP) scheduling scheme is implemented according to some embodiments of the present disclosure.

As pointed out earlier, the focus of the present disclosure is a DL CoMP scheduling algorithm used in a realistic heterogeneous cellular communications network. For this purpose, FIG. 2 illustrates a heterogeneous cellular communications network 22 (hereinafter heterogeneous network 22) according to some embodiments of the present disclosure. As illustrated, the heterogeneous network 22 includes macro cells 24-1, 24-2, and 24-3 (generally referred to herein as macro cells 24) served by a macro base station 26 (e.g., an enhanced or evolved Node B (eNB)). In this example, the macro base station 26 (e.g., macro eNB) serves or controls the three macro cells 24 via corresponding transmission nodes 28-1, 28-2, and 28-3 (generally referred to herein as transmission nodes 28). The transmission nodes 28 may be, for example, separate radio units. The heterogeneous network 22 also includes pico cells 30-1 through 30-12 served or controlled by corresponding pico base stations 32-1 through 32-12 (e.g., pico eNBs). The pico cells 30 serve UEs 34-1 through 34-12, respectively. The macro cells 24 serve UEs 34-13 through 34-18. Notably, the macro cells 24-1, 24-2, and 24-3 are also referred to herein as Macro Cell 1, Macro Cell 2, and Macro Cell 3, respectively. The pico cells 30-1 through 30-12 are also referred to herein as Pico Cell 1 through Pico Cell 12, the UEs 34-1 through 34-12 are also referred to herein as Pico1 UE (for the UE 34 served by Pico Cell 1), Pico2 UE (for the UE 34 served by Pico Cell 2), etc., and the UEs 34-13 through 34-18 are also referred to herein as Macro1 UE (for the UE 34-13 served by Macro Cell 1), Macro2 UEs 1-4 (for the UEs 34-14 through 34-17 served by Macro Cell 2), and Macro3 UE (for the UE 34-18 served by Macro Cell 3). The two thick and bidirectional solid lines illustrated in FIG. 2 represent LTE X2 logical interfaces between the local macro base station (e.g., eNB) 26 shown in FIG. 2 and remote eNBs (not shown).

In addition, in this example, there are six cell clusters 36-1 through 36-6 (generally referred to as cell clusters 36) that are formed via any suitable clustering technique (e.g., the distributed clustering technique described in U.S. Pat. No. 9,344,159. The cell clusters 36 have associated UEs 34. These associated UEs 34 are UEs 34 that have been clustered together with the cells 24, 30 in the cell clusters 36. For example, the cell cluster 36-3 consists of the macro cell 24-2 as well as the pico cells 30-5 and 30-6. The UEs 34-5 and 34-6 in the pico cells 30-5 and 30-6 as well as the UEs 34-15 and 34-16 are associated with the cell cluster 36-3 and, as such, are also sometimes referred to herein as being part of the cell cluster 36-3. Notably, in DL CoMP terminology given in this disclosure, the cells 24, 30 and their served UEs in a particular cell cluster 36 form a DL CoMP cooperating set (specifically, UEs and the corresponding transmission nodes form the DL CoMP cooperating set).

The following description of the proposed DL CoMP scheduling algorithm includes a discussion of each functional component of the proposed algorithm, including: 1) eNB level coordination, 2) macro level coordination, 3) pico level coordination, and 4) macro and pico cell downlink scheduling.

eNB Level Coordination

Figure 3:
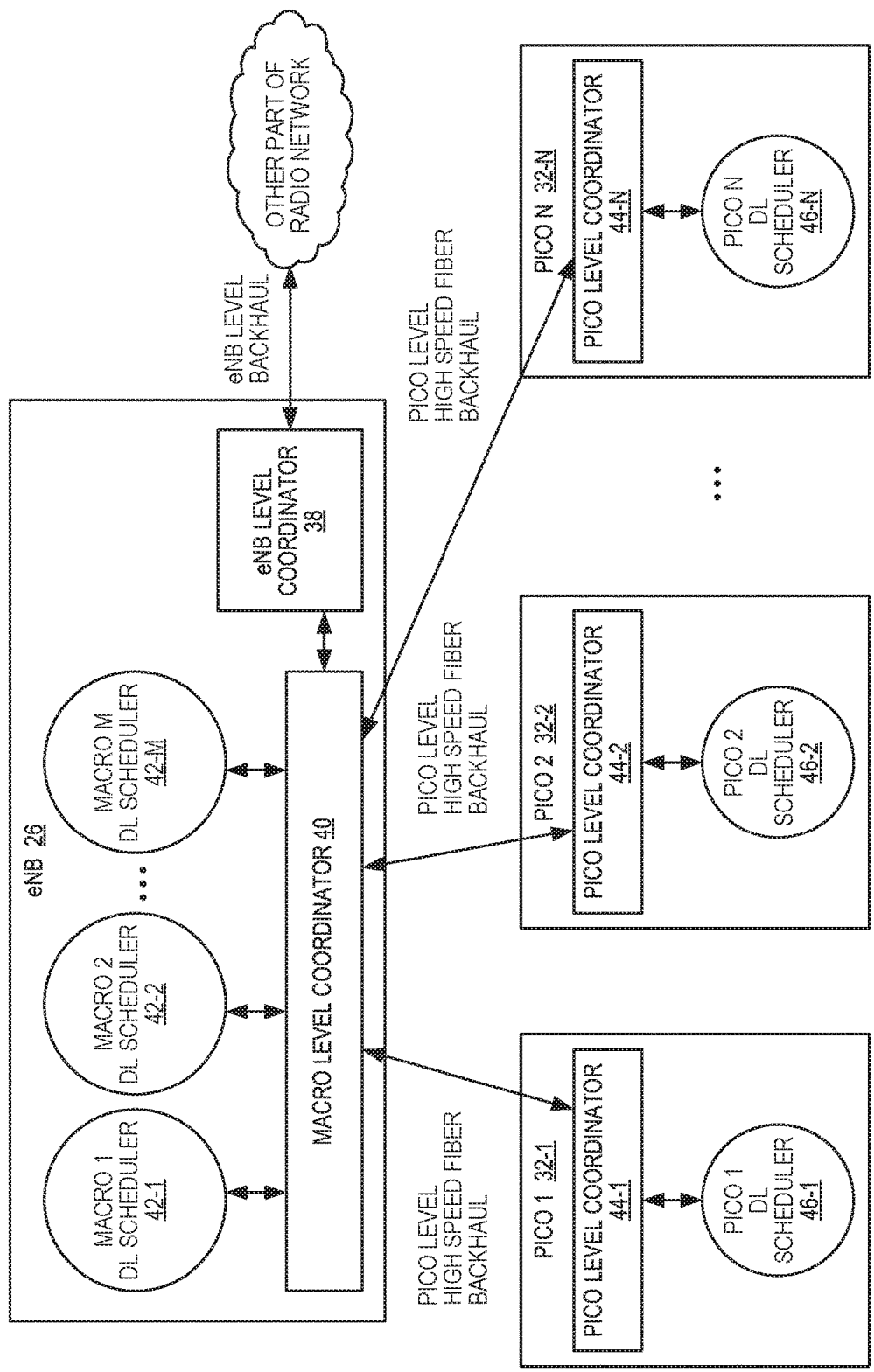
FIG. 3 is a block diagram of macro base stations and pico base stations in the heterogeneous cellular communications network of FIG. 2 according to some embodiments of the present disclosure.

In some embodiments, the DL CoMP scheduling schemes described herein are distributed by nature, meaning that they are deployed on a per-cell basis without a central node. According to U.S. Pat. No. 9,344,159, DL CoMP dynamic multi-cell clustering is also distributed by nature and deployed on a per-cell basis. Thus, the combined functionality of both is jointly illustrated in FIG. 3. In particular, FIG. 3 illustrates the macro eNB 26 as well as the pico eNBs 32 according to some embodiments of the present disclosure. As illustrated, the macro eNB 26 includes an eNB level coordinator 38, a macro level coordinator 40, and a number of macro downlink schedulers 42-1 through 42-M, where M is the number of macro cells 24 controlled by the macro eNB 26 (which in the example of FIG. 2 is three). Similarly, the pico eNBs 32-1 through 32-N (where N is the number of pico cells 30, which in the example of FIG. 2 is 12) include corresponding pico level coordinators 44-1 through 44-N (generally referred to herein as pico level coordinators 44) and pico downlink schedulers 46-1 through 46-N (generally referred to herein as pico downlink schedulers 46). The various coordinators and schedulers illustrated in FIG. 3 may be implemented in hardware or a combination of hardware and software (e.g., software executed by one or more processors).

The coordinators 38, 40, and 44 operate to perform dynamic multi-cell clustering according to, for example, the teachings of U.S. Pat. No. 9,344,159. The downlink schedulers 42 and 46 operate to perform DL CoMP scheduling according to any of the embodiments described herein. A DL CoMP scheduling procedure is performed by every cell, including each macro cell 24 and each pico cell 30, at the same time. As such, FIG. 3 shows an example deployment view and a logical relationship between a distributed multi-cell clustering procedure and a distributed DL CoMP scheduling procedure.

Secondly, the subject of this section is on the eNB level coordinator 38. The eNB level coordinator 38 performs top level coordination between the macro eNB 26 and other remote eNBs (not shown) connected to the macro eNB 26 via an eNB backhaul based on the dynamic multi-cell clustering procedure described in U.S. Pat. No. 9,344,159. Thus, it is good to begin with a brief introduction of the clustering algorithm before going through the functional details of the eNB level coordinator 38.

The dynamic multi-cell clustering procedure is described in detail in U.S. Pat. No. 9,344,159. To briefly explain the dynamic multi-cell clustering procedure, three specific technical terms first need to be introduced. The first term is "UE space," which is defined as a UE set consisting of all active UEs (i.e., in the RRC_CONNECTED state) served by a cell or a network. The second term is "k-dimensional UE constellation," which is defined as a subset of the UE space consisting of those UEs which can successfully measure downlink signal quality values (e.g., Reference Signal Received Power (RSRP) values) from k cells, where k=1, 2, . . . , K and K is the maximum number of measured cells in the network. The third term is "k-dimensional UE group," which is defined as a subset of a k-dimensional UE constellation consisting of those UEs for which the measured k signal quality values (e.g., RSRP values) are associated with a same group of cells regardless of the order in which each signal quality value is measured from cells in the group. With these definitions, some embodiments of the dynamic multi-cell clustering procedure can be explained step by step with respect to a single serving cell as described below. In the example of FIG. 3, this procedure is performed by each of the macro and pico level coordinators 40 and 44 (i.e., the procedure is performed for each of the macro and pico cells 24 and 30).

Step 1: The coordinator 40, 44 collects all RSRP reports from each UE(n) in the UE space of the corresponding cell 24, 30 via the uplink and then creates a RSRP value list for each UE(n) denoted as $$L(n)=\{RSRP(i_1),RSRP(i_2), \ldots ,RSRP(i_k), \ldots \},$$

where $i_1, i_2, \ldots, i_k$ are the global indices of measured cells in the heterogeneous network 22, called the associated cells of UE(n).

Step 2: The coordinator 40, 44 sorts out each created RSRP list L(n) based on the magnitude of each RSRP value in a descending order and then truncates the sorted list with a defined RSRP threshold $T_{RSRP}$, i.e., if $RSRP(i_{k+i}) < T_{RSRP}$, then get rid of $RSRP(i_{k+i})$ and other later values from the list, resulting in $L_{T_{RSRP}}(n) = \{RSRP(i_1), RSRP(i_2), \ldots, RSRP(i_k)\}$ where each $RSRP(i_k)$ is equal to or greater than $T_{RSRP}$.

Step 3: The coordinator 40, 44 classifies each UE(n) into a k-dimensional UE constellation if the number of elements in the truncated RSRP list $L_{T_{RSRP}}(n)$ of UE(n) is equal to k, denoted by A(k) as below for k=1, 2, 3, . . . .

$A(1) = \{UE(n): L_{T_{RSRP}}(n) \text{ has one RSRP element}\}$ $A(2) = \{UE(n): L_{T_{RSRP}}(n) \text{ has two RSRP elements}\}$ $A(3) = \{UE(n): L_{T_{RSRP}}(n) \text{ has three RSRP elements}\}$

. . .

Step 4: In each k-dimensional UE constellation A(k), the coordinator 40, 44 further classifies each UE(n) into a k-dimensional UE group denoted as $G(i_1, i_2, \ldots, i_k) = \{UE(n)\}$, where $i_1, i_2, \ldots, i_k$ are global cell indices in the heterogeneous network 22. The rule is that $G(i_1, i_2, \ldots, i_k)$ is formed by those UEs associated with a same group of cells through their measured RSRP values, and the group of cells are identified in terms of their global cell index sequence $i_1, i_2, \ldots, i_k$ regardless of the order in which each index appears in the sequence.

Step 5: The coordinators 38, 40, and 44 perform inter-cell communication to exchange information about each formed k-dimensional UE group with other associated cells identified by their global indices in each $G(i_1, i_2, \ldots, i_k)$. This communication is performed between the associated cells of each k-dimensional UE group via the backhaul of each pico cell 30, the internal paths between different macro cells 24 if they are managed by a single eNB, and/or the backhauls between different eNBs if they are managed by a different eNB. The exchanged information is at least about two sets of indices, one is the UE index set containing every UE in $G(i_1, i_2, \ldots, i_k)$ and the other is the cell index set containing every cell associated with $G(i_1, i_2, \ldots, i_k)$.

Step 6: The coordinator 40, 44 merges each k-dimensional UE group $G(i_1, i_2, \ldots, i_k)$ created for the corresponding (serving) cell with the k-dimensional UE group(s) (received from other associated cells) having the same group of cells identified in terms of their global cell index sequence $i_1, i_2, \ldots, i_k$ regardless of the order in which each index appears in the sequence so as to create a k-dimensional cell cluster, i.e., a CoMP cooperating set, denoted by $U_{CoMP}(i_1, i_2, \ldots, i_k) = \{\text{UEs: Belong to the same k-dimensional UE groups}\}$, where the " . . . same k-dimensional UE groups . . . " means that all k-dimensional UE groups in the created k-dimensional cell cluster are associated with a same group of cells identified by the cell global index sequence $i_1, i_2, \ldots, i_k$ regardless of the order in which each index appears in the sequence. This merging operation must be done for each k-dimensional UE group, where k=1, 2, . . . , K and K is the maximum dimension. If a k-dimensional UE group cannot find any target received from other associated cells to merge with, it forms, by itself, a k-dimensional cell cluster.

Besides these six steps, the dynamic multi-cell clustering procedure may also have a timer with a timeout period of T. The timer is started running at the beginning of Step 1 and checked at the end of Step 6 to see if it has timed out with the consequence that if it expires, the procedure is started over from Step 1; and if the timer has not timed out, the procedure enters a sleeping state to wait for the timeout. Therefore, the time period T is the operational cycle of the procedure and determines the update speed of dynamic multi-cell clustering in the heterogeneous network 22.

Back at the eNB level coordination, the main task performed by the eNB level coordinator 38 is to work with the local macro level coordinator 40 as well as each remote associated eNB level coordinator (not shown) in order to implement the clustering algorithm functionality and procedure as explained earlier between the local macro cells 24 and pico cells 30 and remote cells. The eNB level coordinator 38 mainly conducts the inter-cell communication described in Step 5 described above via the eNB backhauls connected to the macro eNB 26 (as shown in FIG. 2) with other remote eNBs in the heterogeneous network 22. On one hand, the eNB level coordinator 38 handles all transmissions of corresponding control signaling, which are carrying information about each k-dimensional UE group created locally and needed to be sent to remote associated cells managed by other eNBs. On the other hand, the eNB level coordinator 38 also handles receptions of all control signaling from remote associated cells across the heterogeneous network 22 and passes on the received messages to the local associated cells. In essence, the eNB level coordinator 38 is a bridge between locally associated cells and remotely associated cells for each k-dimensional UE group formed by the clustering procedure across the heterogeneous network 22.

Macro Level Coordination

As shown in FIG. 3, the macro level coordinator 40 is a gateway among the macro downlink schedulers 42 of the macro cells 24 and the pico downlink schedulers 46 of the pico cells 30 (via the corresponding pico level coordinators 44) and even in remote eNBs via the local eNB level coordinator 38 and backhaul discussed earlier. The macro level coordinator 40 performs tasks including:

Inter-cell information exchange via the eNB level coordinator 38 and backhaul with remote cells across the heterogeneous network 22, and Inter-cell coordination among local macro cells 24 and pico cells 30 via internal paths of the macro level coordinator 40 as well as the pico level coordinators 44.

Like the eNB level coordinator 38, the macro level coordinator 40 plays an important role in inter-cell communication as described at Step 5 of the clustering procedure discussed above. The macro level coordinator 40 allows information about various k-dimensional UE groups created by either local cells or remote cells to pass through itself back and forth between associated local cells. To complete this task, the macro level coordinator 40 handles all required control signaling and traffic data, as well as responds in time to any request related to inter-cell communication from and/or to the dynamic multi-cell clustering distributed anywhere in the heterogeneous network 22.

As the second functional task, the macro level coordinator 40 manages various control signaling and traffic data flowing between different local macro cells 24 as well as between different pico cells 30 distributed over each local macro cell 24 via the corresponding pico level coordinators 44. Concretely speaking, this task can be split into at least the following two subtasks but not limited to them:

Perform inter-cell communication to form each k-dimensional cell cluster between associated cells based on the dynamic multi-cell clustering algorithm.

Conduct transmission and reception of various scheduling information as well as coordinated precoding related data streams between different associated cells to support DL CoMP schemes, e.g., JP/JT and CS/CB.

As a result of the first subtask, various cell clusters 36 may be created within the coverage of each macro cell 24 or across two neighboring macro cells 24 as shown in FIG. 2. In the following discussion, the cell cluster 36-1 in FIG. 2 is taken as a simple example to explain how a cell cluster 36 is formed with the support of the macro level coordinator 40 in terms of the dynamic multi-cell clustering procedure.

From FIG. 2, it can be seen that Cell Cluster 1 is across two neighboring macro cells 24, Macro 1 and Macro 3. Cell Cluster 1 consists of three cells and three UEs 34 including Macro cell 1 denoted by m1, the pico cell 30-4 (Pico 4) denoted by p4, which is located in Macro 1, and the pico cell 30-11 (Pico 11) denoted by p11, which is located in Macro 3, as well as the Macro 1 UE 34-13 (Macro 1 UE) denoted by $UE_{m1}$, the Pico 4 UE 34-4 (Pico4 UE) denoted by $UE_{p4}$, and the Pico 11 UE 34-11 (Pico11 UE) denoted by $UE_{p11}$. Cell Cluster 1 is formed according to the dynamic multi-cell clustering algorithm step by step with the following operations performed by each involved macro cell 24 and pico cell 30:

Step 1: After receiving RSRP reports from each served UE 34, each cell 24, 30 creates a RSRP list for the UEs 34 as listed below:

Macro 1: $L(UE_{m1})=\{rsrp(m1), rsrp(p4), rsrp(p11), \ldots\}$.

Pico 4: $L(UE_{p4})=\{rsrp(p4), rsrp(p11), rsrp(m1), \ldots\}$.

Pico 11: $L(UE_{p11})=\{rsrp(p11), rsrp(p4), rsrp(m1), \ldots\}$.

Step 2: Assume that only $rsrp(m1) > T_{RSRP}$, $rsrp(p4) > T_{RSRP}$, and $rsrp(p11) > T_{RSRP}$ without loss of generality. The three RSRP lists are sorted out and truncated by each cell 24, 30 with the outcomes as below:

Macro 1: $L(UE_{m1})=\{rsrp(m1), rsrp(p4), rsrp(p11)\}$.

Pico 4: $L(UE_{p4})=\{rsrp(p4), rsrp(m1), rsrp(p11)\}$.

Pico 11: $L(UE_{p11})=\{rsrp(p11), rsrp(m1), rsrp(p4)\}$.

Step 3: Each cell 24, 30 classifies its served UEs 34 into a k-dimensional UE constellation A(k), where k=3 for this case, and the outcomes are:

Macro 1: $A(3)=\{UE_{m1}:L(UE_{m1})$ has 3 elements.$\}$.

Pico 4: $A(3)=\{UE_{p4}:L(UE_{p4})$ has 3 elements.$\}$.

Pico 11: $A(3)=\{UE_{p11}:L(UE_{p11})$ has 3 elements$\}$.

Step 4: Each cell 24, 30 further classifies its served UEs 34 in A(3) into a k-dimensional UE group $G(i_1, i_2, \ldots, i_k)$ where k is 3 for each cell 24, 30. In order to emphasize the ownership of each cell 24, 30 on each created k-dimensional group, the expression $G_x(i_1, i_2, \ldots, i_k) = G(i_1, i_2, \ldots, x, \ldots, i_k)$ is introduced to express the outcomes as listed below:

Macro 1: $G(m1, p4, p11)=\{UE_{m1}\}=G_{m1}(p4, p11)$.

Pico 4: $G(p4, m1, p11)=\{UE_{p4}\}=G_{p4}(m1, p11)$.

Pico 11: $G(p11, m1, p4)=\{UE_{p11}\}=G_{p11}(m1, p4)$.

At this time, each cell 24, 30 only has a local picture about various k-dimensional UE groups.

Step 5: As mentioned earlier, the macro level coordinator 40 plays a significant role at this step. Each cell 24, 30 exchanges the information about the created k-dimensional UE group with the associated cells 24, 30 by inter-cell communication via the macro level coordinator 40 and the pico level coordinators 44. Each created k-dimensional UE group is represented at least by two sets of indices, one is a set of indices of UEs 34 included in the group and the other is a set of indices of associated cells 24, 30. Then, each cell 24, 30 sends a message carrying these two sets of indices for each created UE group to each associated cell 24, 30 via the macro level coordinator 40 as well as each related pico level coordinator 44. However, note that the concrete format of such a message is not the focus of this disclosure. Any suitable format may be used. Afterwards, the outcomes for each cell are:

Macro 1: $G_{m1}(p4, p11), G_{p4}(m1, p11)$, and $G_{p11}(m1, p4)$.

Pico 4: $G_{p4}(m1, p11), G_{m1}(p4, p11)$, and $G_{p11}(m1, p4)$.

Pico 11: $G_{p11}(m1, p4), G_{m1}(p4, p11)$, and $G_{p4}(m1, p11)$.

After the inter-cell communication, each cell 24, 30 obtains a global picture of various k-dimensional UE groups.

Step 6: This is the final step of the dynamic multi-cell clustering procedure, at which each cell 24, 30 merges all same k-dimensional UE groups together to form a k-dimensional cell cluster, i.e., the desired CoMP cooperating set. For this scenario, the outcomes are:

Macro 1: $U_{CoMP}(m1, p4, p11)=\{UE_{m1}, UE_{p4}, UE_{p11}\}$.

Pico 4: $U_{CoMP}(m1, p4, p11)=\{UE_{m1}, UE_{p4}, UE_{p11}\}$.

Pico 11: $U_{CoMP}(m1, p4, p11)=\{UE_{m1}, UE_{p4}, UE_{p11}\}$.

The final result shows that the cell cluster 36-1 is uniquely formed and completely known by the downlink scheduler 42, 46 of each associated cell 24, 30.

The second subtask will be discussed in detail below with a comprehensive example where both the cell clustering and the downlink scheduling will be explained together.

Pico Level Coordination

As indicated by the name, the pico level coordinator 44 performs the multi-cell coordination at the pico level. It is important for coordinated downlink scheduling of each pico cell 30 as shown in FIG. 3. The pico level coordinator 44 handles various control signaling and data related transmission and reception between each pico cell 30 and each macro cell 24 via a backhaul interface. In the present disclosure, it is assumed that the backhaul interface is physically implemented by a high speed fiber, which has almost unlimited capacity relative to required control signaling and data transmission bandwidth. From the coordination perspective, one logical end of this backhaul interface is at the pico level coordinator 44 and the other end is at the macro level coordinator 40 as shown in FIG. 3. Like the macro level coordinator 40, the pico level coordinator 44 also has as least two subtasks but is not limited thereto:

Perform inter-cell communication to form each k-dimensional cell cluster between associated cells based on the dynamic multi-cell clustering algorithm.

Conduct transmission and reception of various scheduling information as well as coordinated precoding related data streams between different associated cells to support DL CoMP schemes, e.g., JP/JT and CS/CB.

In the following discussion, the cell cluster 36-2 of FIG. 2 is taken as another simple example to explain how a cell cluster 36 is formed within a macro cell 24 with the support of the pico level coordinator 44 of each pico cell 30 in terms of the dynamic multi-cell clustering procedure.

As shown in FIG. 2, the cell cluster 36-2 (Cell Cluster 2) is formed within the macro cell 24-1 and consists of three pico cells, namely, pico cells 30-1, 30-2, and 30-3 (which also referred to herein as pico cells 1, 2, and 3 or simply Pico 1, Pico 2, and Pico 3 and are denoted as p1, p2, and p3). The cell cluster 36-2 also includes UEs 34-1, 34-2, 34-3, 34-4, and 34-13, which are referred to as Pico1 UE ($UE_{p1}$), Pico2 UE ($UE_{p2}$), Pico3 UE ($UE_{p3}$), Pico4 UE ($UE_{p4}$), and Macro 1 UE ($UE_{m1}$), respectively. Following the same multi-cell clustering procedure as discussed above, the cell cluster 36-2 is formed as follows:

Step 1: After receiving RSRP reports from each served UE 34, each cell 24, 30 creates a RSRP list for the UE 34 as listed below. Notably, in this example, the cell cluster 36-2 ends up including only pico cells 30 and, as such, only those pico cells 30 are discussed in this example. However, it should be understood that the macro cells 24 are also performing this procedure.

Pico 1: $L(UE_{p1})=\{rsrp(p1),rsrp(p2),rsrp(p3),\ldots\}$.

Pico 2: $L(UE_{p2})=\{rsrp(p2),rsrp(p1),rsrp(p3),\ldots\}$.

Pico 3: $L(UE_{p3})=\{rsrp(p3),rsrp(p1),rsrp(p2),\ldots\}$.

Step 2: Assume that only $rsrp(p1)>T_{RSRP}$, $rsrp(p2)>T_{RSRP}$, and $rsrp(p3)>T_{RSRP}$ without loss of generality. The three RSRP lists are sorted out and truncated by each pico cell 30 as below:

Pico1: $L(UE_{p1})=\{rsrp(p1),rsrp(p2),rsrp(p3)\}$.

Pico 2: $L(UE_{p2})=\{rsrp(p2),rsrp(p1),rsrp(p3)\}$.

Pico 3: $L(UE_{p2})=\{rsrp(p3),rsrp(p2),rsrp(p1)\}$.

Step 3: Each pico cell 30 classifies its served UEs 34 into a k-dimensional UE constellation A(k), where k=3 for this case and the outcomes are:

Pico 1: $A(3)=\{UE_{p1}:L(UE_{p1})$ has 3 elements.$\}$.

Pico 2: $A(3)=\{UE_{p2}:L(UE_{p2})$ has 3 elements.$\}$.

Pico 3: $A(3)=\{UE_{p3}:L(UE_{p3})$ has 3 elements$\}$.

Step 4: Each pico cell 30 further classifies its served UEs 34 in each A(3) into a k-dimensional UE group $G(i_1, i_2, \ldots, i_k)$ where k is 3 for each pico cell 30. In order to emphasize the ownership of each cell on each created k-dimensional group, the expression $G_x(i_1, i_2, \ldots, i_k)=G(i_1, i_2, \ldots, x, \ldots, i_k)$ is introduced to express the outcomes as listed below:

Pico 1: $G(p1,p2,p3)=\{UE_{p1}\}=G_{p1}(p2,p3)$.

Pico 2: $G(p2,p1,p3)=\{UE_{p2}\}=G_{p2}(p1,p3)$.

Pico 3: $G(p3,p2,p1)=\{UE_{p3}\}=G_{p3}(p2,p1)$.

At this time, each pico cell 30 only has a local picture about various k-dimensional UE groups.

Step 5: The pico level coordinator 44 plays a significant role at this step. Each pico cell 30 exchanges the information about the created k-dimensional UE group with the associated cells by inter-cell communication via its pico level coordinator 44. Each created k-dimensional UE group is represented at least by two sets of indices, one is a set of indices of UEs 34 included in the group and the other is a set of indices of associated pico cells 30. Then, each pico cell 30 sends a message carrying these two sets of indices for each created UE group to each associated pico cell 30 via the pico level coordinator 44 (as well as to each macro cell 24 via the macro level coordinator 40). Afterwards, the outcomes for each pico cell 30 are:

Pico 1: $G_{p1}(p2,p3), G_{p2}(p1,p3)$, and $G_{p3}(p1,p2)$.

Pico 2: $G_{p2}(p1,p3), G_{p1}(p2,p3)$, and $G_{p3}(p2,p1)$.

Pico 3: $G_{p3}(p1,p2), G_{p2}(p1,p3)$, and $G_{p1}(p2,p3)$.

After the inter-cell communication, each pico cell 30 obtains a global picture of various k-dimensional UE groups.

Step 6: This is the final step of the dynamic multi-cell clustering procedure, at which each cell merges all same k-dimensional UE groups together to form a k-dimensional cell cluster, i.e., the desired CoMP cooperating set. For this scenario, the outcomes are:

Pico 1: $U_{CoMP}(p1,p2,p3)=\{UE_{p1},UE_{p2},UE_{p3}\}$.

Pico 2: $U_{CoMP}(p1,p2,p3)=\{UE_{p1},UE_{p2},UE_{p3}\}$.

Pico 3: $U_{CoMP}(p_1,p2,p3)=\{UE_{p1},UE_{p2},UE_{p3}\}$.

The final result shows that the cell cluster 36-2 is uniquely formed and completely known by the pico downlink scheduler 46 of each associated pico cell 30.

The second task will be discussed in detail below with a comprehensive example where both the cell clustering and the downlink scheduling will be explained together.

Downlink Scheduling

With the given macro and pico level coordination, the downlink resource allocation for UEs 34 served by a single cell 24, 30 is performed by the corresponding downlink scheduler 42, 46 as shown in FIG. 3. Although the scheduling operation is performed by each downlink scheduler 42, 46 respectively, every scheduling decision is made based on the information exchanged via the corresponding macro and pico level coordinators 40, 44 between k associated cells in a k-dimensional cell cluster. Since a k-dimensional cell cluster is formed by the dynamic multi-cell clustering procedure, the downlink scheduling is dynamic in time as well, meaning that the downlink scheduling is done with respect to a cell cluster 36 formed at a specific time and updated every time period of T, which is a system constant and configurable for eNB operators. On the other hand, within a time cycle of T, the downlink scheduling is conducted every scheduling period which is one Transmit Time Interval (TTI) long in time. As such, all scheduling operations are accomplished with the inputs and outputs specific to a particular TTI. This dynamic feature allows the downlink scheduling procedure to fit the varying property of inter-cell co-channel interference so as to provide a balanced performance with time.

In some embodiments the present disclosure proposes a distributed DL CoMP scheduling procedure for every cell 24, 30 in the heterogeneous network 22, meaning that the downlink scheduling procedure is performed on a per-cell basis and able to perform downlink resource assignment for UEs 34 in terms of the specific requirement of a DL CoMP scheme. Both JP/JT and CS/CB DL CoMP schemes are assumed to be used simultaneously in terms of different scheduling scenarios. For example, if $UE_1$, $UE_2$, and $UE_3$ in a cell cluster 36 are assigned with the same frequency and/or time resources, the JP/JT scheme is set as the transmission mode for the downlink to $UE_1$, $UE_2$, and $UE_3$ on the assigned resources; and at the same time, if $U_4$ and $U_5$ in the same cell cluster 36 are assigned with different frequency resources, the CS/CB scheme is used as the transmission mode for the downlink to $UE_4$ and $UE_5$ on the assigned resource. Furthermore, if a subset of resource blocks scheduled to a single $UE_6$ is shared with other UEs, those resource blocks should be used to transmit data using the DL CoMP JP/JT transmission mode to the $UE_6$; for other unshared resource blocks, they should be used to transmit data to the $UE_6$ by using the DL CoMP CS/CB transmission mode simultaneously. This mixed usage of the JP/JT scheme and the CS/CB scheme in one cell cluster 36 and even for a single UE provides substantial design flexibility for the DL CoMP scheduling procedure.

By design, the downlink schedulers 42, 46 use a cluster-wide joint downlink scheduling scheme in order to address the issue of how common downlink radio resources including frequency and/or time resources are effectively and efficiently allocated to multiple UEs 34 being served by each cell 24, 30 in the heterogeneous network 22 while satisfying each UE's Quality of Service (QoS) requirement. This issue is addressed by the present disclosure.

Before going through the details of each aspect of the present disclosure, it is good to begin with a brief introduction to conventional downlink resource scheduling in a LTE wireless network to set the background of knowledge. Thus, in the following, the conventional maximum throughput scheduling and the conventional proportional fair scheduling are taken as examples for such purpose.

It is well known that a conventional LTE downlink cell scheduler operates in both the Time Domain (TD) and the Frequency Domain (FD) simultaneously by using Orthogonal Frequency Division Multiple Access (OFDMA) technology. The LTE downlink cell scheduler allows multiple users to orthogonally share available OFDM sub-carriers in a TTI, which is used as the scheduling period with a length of 1 millisecond (ms). Such a cell scheduler usually consists of two components to perform TD scheduling and FD scheduling, respectively. The former is to select a certain number of UEs, or users, $N_{users}$ from a total number of active UEs served by the cell at a TTI based on certain priority metric; and the latter is to assign a certain number of Scheduling Blocks (SBs), each of which represents a minimum unit of scheduling resource in TD and FD, and specify an appropriate Modulation and Coding Scheme (MCS) to those selected scheduling candidates in terms of certain optimization criterion and Channel Quality Indicators (CQIs) reported by the UEs. A SB may also be referred to herein as a scheduling resource block or simply a resource block. The priority metrics and optimization criteria used for TD and FD scheduling can be different in order to provide a greater degree of design flexibility.

To quantify the scheduling issue, a system model is usually needed. This can be done from looking into the structure of a single SB, which consists of $L_{sb}$ consecutive OFDM symbols within a TTI denoted by $T_{tti}$ in TD and a certain number of consecutive OFDM subcarriers in FD. The three quantities can be defined with respect to a SB. One is to let K(l), l=1, 2, ..., $L_{sb}$ be the number of data-carrying subcarriers for symbol l in a SB; and the other two is to let $R_j$ be the code rate corresponding to MCS(j) and $M_j$ be the constellation size of MCS(j), where j=1, 2, ..., J and J is the maximum MCS index in the system. As a result, the bit data rate $r_j$ provided by a single SB is given by $$r_j = \frac{R_j \log_2(M_j)}{T_{tti}} \sum_{l=1}^{L_{sb}} K(l),$$

where it is assumed that all subcarriers in a SB use the same MCS, which is the case in LTE.

Next, for TTI(t), let U(t) be the set of active UEs, or users, at time t; $N_{SB}(t)$ be the set of downlink SBs available for scheduling at time t; and assume that each UE in U(t) reports a CQI value reflecting channel quality of each SB in $N_{SB}(t)$. If we let $x_{u,n}$ be such a CQI value reported by a UE denoted by UE(u) for a SB denoted by SB(n), then the maximum rate MCS(j) which can be supported by UE(u) on SB(n) can be expressed as $$j_{u,max}(x_{u,n}) = \arg\left(\max_j(r_j) \mid x_{u,n}\right).$$

It is also assumed that the rate of MCS(1) is the lowest and the rate of MCS(J) is the highest in the system. As a result, the bit rate per SB, $r_j$, increases monotonically with the MCS index j. It is clear that $1 \leq j_{u,max}(x_{u,n}) \leq J$. Since a unique MCS index has to be selected for all SBs assigned to a user in a TTI, it might not be the case that every available SB is able to be assigned to the UE. For example, if the MCS(j) is selected for a UE, then only those SBs whose $j_{u,max}(x_{u,n}) \geq j$ can be assigned to that UE. This is because only those SBs have good enough channel quality to support MCS(j).

According to the system model given above, the conventional maximum throughput scheduling can be formulated as an optimization problem $P_0$ for a single UE at first and then extended to the optimization problem $P_1$ for multiple UEs. For the single UE optimization, the aim is to determine a proper MCS(j) that a UE can support on each SB in $N_{SB}(t)$ in order to maximize the total assigned bit rate which is a function of $r_j$, under the condition of given the CQI set $\{x_{u,n}, n \in N_{SB}(t)\}$ reported by the UE. This can be done by solving the optimization problem $P_0$:

$$P_0: \max_{b_u} \sum_{n \in N_{SB}(t)} \sum_{j=1}^{J_{max}(x_u)} b_{u,j} \cdot r_j$$

subject to the constraints for $b_u$:

$$\sum_{j=1}^{J_{max}(u)} b_{u,j} = 1, \quad \forall u$$

$$b_{u,j} \in \{0, 1\}, \quad \forall u, j,$$

where $$J_{max}(x_u) = \max_n \{j_{u,max}(x_{u,n}) \mid n \in N_{SB}(t)\},$$

-continued $$b_u = \{b_{u,j} \mid j = 1, 2, \ldots, J_{max}(x_{u,n}), n \in N_{SB}(t)\}, \text{ and}$$

$$b_{u,j} = \begin{cases} 0, & \text{if user } u \text{ is not assigned } MCS \ j \\ 1, & \text{if user } u \text{ is assigned } MCS \ j \end{cases}$$

For multiple users, the optimization problem $P_1$ is formulated on the basis of the $P_0$ with another A vector over the both U(t) and $N_{SB}(t)$:

$$P1: \max_{A,B} \sum_{u \in U(t)} \sum_{n \in N_{SB}(t)} a_{u,n} \sum_{j=1}^{J_{max}(x_u)} b_{u,j} \cdot r_j \quad (1)$$

subject to the constraints for A and B as below:

$$\sum_{u \in U(t)} a_{u,n} = 1, \ \forall n \quad (2)$$

$$a_{u,n} \in \{0, 1\}, \ \forall u, n$$

$$\sum_{j=1}^{J_{max}(u)} b_{u,j} = 1, \ \forall u$$

$$b_{u,j} \in \{0, 1\}, \ \forall u, j$$

$$n \in \bigcup_{u \in U(t)} N_{SB}(t)$$

where $A = \{a_{u,n} \mid u \in U(t), n \in N_{SB}(t)\}$ and $B = \{b_{u,j} \mid j=1, 2, \ldots, J_{max}(x_u), u \in U(t)\}$.

Similarly, the conventional proportional fair scheduling can be formulated as the optimization problem $P_2$ by $$P_2: \max_{A,B} \sum_{u \in U(t)} \sum_{n \in N_{SB}(t)} a_{u,n} \sum_{j=1}^{J_{max}(x_u)} b_{u,j} \cdot \left(\frac{r_j}{d_u(t)}\right) \quad (3)$$

subject to the same constraints for A and B as given in (2), where $d_{\overline{u}}(t)$ is the average bit rate up to TTI(t−1) and can be calculated by $$d_{\overline{u}}(t) = (1-\alpha)d_u(\overline{t}-1) + \alpha \cdot r_u(t), (\alpha \in [0,1]),$$

where $r_u(t)$ is the total bit rate assigned to user(u) at TTI(t).

It is noted that the optimization problems $P_1$ and $P_2$ are non-linear in nature and, therefore, a brute force search on the UE vector A and the MCS vector B is needed to solve the problems, which may be difficult if the scale of the problems is large. Thus, the linearization of these optimization problems becomes useful and necessary. However, this is not the focus of this present disclosure. While not essential for understanding the concepts disclosed herein, the interested reader is directed to Kwan, R. et al., "Downlink Resource Scheduling in an LTE System," Mobile and Wireless Communications: Physical layer development and implementation, INTECH Open Access Publisher, 2010, pages 189-207 for more information regarding linearization of these optimization problems. The focus of the present disclosure is to develop a DL CoMP scheduling algorithm to combat inter-cell co-channel interference. This can be started by performing analysis and integration on some common features and properties found from the discussed conventional scheduling algorithms.

First of all, it can be seen from the optimization problems $P_1$ and $P_2$ that a set of MCS indices mapped from a set of CQI values reported by each UE for each available SB at time t, denoted by $J_{max}(x_u) = \{j_{u,max}(x_{u,n}) \mid n \in N_{SB}(t)\}$, plays an important role in multiuser, or multi-UE, scheduling, where $x_{u,n}$ represents the CQI value reported by UE(u) for SB(n); $N_{SB}(t)$ is a set of SBs available for scheduling in TTI(t); and $j_{u,max}(x_{u,n})$ is the highest MCS index that user(u) can support on SB(n) with $1 \le j_{u,max}(x_{u,n}) \le J$, where J is the maximum MCS index of the system. It is also noted that the UE vector $A = \{a_{u,n} \mid u \in U(t), n \in N_{u,SB}(t)\}$ and the MCS vector $B = \{b_{u,j} \mid j=1, 2, \ldots, J_{max}(u), u \in U(t)\}$, where U(t) is the UE space on the cell 24, 30, are also important and represent the outcomes from the optimization process. The former determines which UEs are selected as scheduling candidates by the algorithm for which SBs and the latter decides which MCS indices corresponding to selected SBs are allocated to selected UE candidates via link adaptation and downlink resource assignment. In addition, the other interesting factors are a set of parameters reflecting different scheduling strategies, priority, and criteria, for example, $r_j$ for the maximum throughput scheduling and $r_j$, $d_u(t)$, and $\alpha$ for the proportional fair scheduling. Therefore, at the first step, it makes perfect sense that an integration of all of these factors can be made in a more general manner and form for the downlink scheduler 42, 46 discussed in this section. Thus, it is formulated as the optimization problem $P_3$ by:

$$P_3: \max_{A,B} F(J(x_u), A, B, p_1, p_2, \ldots, p_m) \quad (4)$$

where $\{p_1, p_2, \ldots, p_m\}$ is a set of parameters representing different scheduling strategies and criteria as mentioned earlier.

Secondly, it is desirable to find a concrete form of Equation (4) so that the optimization problem can be resolved. Generally speaking, it can take any type of form in terms of scheduling strategies and criteria. In the present disclosure, however, the two concrete forms of Equation (4) to be considered are the maximum throughput scheduling algorithm and the proportional fair scheduling algorithm. Since the conventional maximum throughput scheduling algorithm is by nature in favor of cell center UEs due to their much better channel qualities than that of cell edge UEs, more considerations need to be made to introduce this optimization criterion into the coordinated downlink scheduling. On the other hand, it is quite straightforward to bring the proportional fair strategy into the proposed DL CoMP scheduling algorithm. Thus, with the proportional fair scheduling strategy as the first choice, the concrete form of Equation (4) can be:

$$f_k(J(x_u), A, B, p_1, p_2, \ldots, p_m) = \sum_{u \in U(t)} \sum_{n \in N_{SB}(t)} a_{u,n} \sum_{j=1}^{J_{max}(x_u)} b_{u,j} \cdot \left(\frac{r_j}{d_u(t)}\right) \quad (5)$$

where a set of parameters, $\{p_1, p_2, \ldots, p_m\}$, is replaced by the proportional fair scheduling related parameters $r_j$, $d_u(t)$, and $\alpha$ as defined earlier. Note that the UE space and the resource space, over which the optimization is conducted, are the entire UE space U(t) composed by all active UEs 34 served by the cell 24, 30 at TTI(t) and the entire resource space $N_{SB}(t)$ composed by all SBs available for scheduling at TTI(t), respectively. This makes the first-step operation of the proposed DL CoMP scheduling algorithm to be as usual as the conventional single cell scheduling when the proportional fair strategy is used. The second-step operation of the algorithm is to manipulate scheduled SBs of each UE in a k-dimensional cell cluster as k>1 and set a proper transmission mode for each UE in terms of assigned SBs for the transmission mode. This step will be discussed in detail later.

Back to the conventional maximum throughput scheduling, as mentioned earlier, it is in favor of cell center UEs due to their much better channel qualities than that of cell edge UEs. On the other hand, according to the definition of a k-dimensional cell cluster, the involved UEs are actually cell edge UEs by nature, meaning that without any improvement, the conventional maximum throughput scheduling criterion is by nature not appropriate for the DL CoMP scheduling algorithm disclosed herein. However, with the effort and proposal made in the following, this problem is completely solved and the maximum throughput scheduling criterion successfully becomes another good choice for the proposed algorithm. To explain, it is desirable to further explore and derive the structure of F(*) given in Equation (4) in terms of the internal structure of the UE space for the maximum throughput scheduling strategy.

To do so, we begin with looking into the detailed structure of each k-dimensional cell cluster formed on a cell 24, 30 according to the dynamic multi-cell clustering algorithm. From the discussion above, it is known that a CoMP cooperating set, i.e. a cell cluster 36, is composed of all k-dimensional UE groups which have different UEs 34 but a same set of associated cells 24, 30, including a serving cell 24, 30 of each UE 34 as well as k−1 adjacent cells 24, 30, which are able to affect the quality of downlink signal reception of each UE 34. Thus, each cell cluster 36 has a unique parameter of k being equal to 1, 2, ..., or K, where K is the maximum number of cells 24, 30 associated with each UE 34 in the cell cluster 36. The value of K depends on the threshold $T_{RSRP}$, which is a system constant as mentioned earlier. In a word, every cell cluster 36 has its own dimension of k. This provides a possibility to split the function F(*) into a set of sub-functions by $$F(J(x_u), A, B, p_1, p_2, \ldots, p_m) = \begin{cases} f_1(J(x_u), A, B, p_1, p_2, \ldots, p_m) & \text{if } k=1 \\ f_2(J(x_u), A, B, p_1, p_2, \ldots, p_m) & \text{if } k=2 \\ \vdots \\ f_K(J(x_u), A, B, p_1, p_2, \ldots, p_m) & \text{if } k=K \end{cases} \quad (6)$$

where each $f_k(*)$ corresponds to each k-dimensional cell cluster 36 formed on a cell 24, 30.

Next, it is desirable to define the UE space for each $f_k(*)$ in Equation (6) since each $f_k(*)$ is specifically defined in terms of each k-dimensional cell cluster 36 rather than the entire cell 24, 30. It is obvious that the UE space for a k-dimensional cell cluster 36 shrinks down from the entire UE space U(t) of a cell 24, 30 to a subset of U(t) denoted by $U_k(t)$, k=1, 2, ..., K. The UE space is defined as the set of UEs 34 involved in each k-dimensional cell cluster 36 but served by the cell 24, 30. Please note that since a macro cell 24 may have multiple cell clusters 36 with the same dimension of k, each $f_k(*)$ defined in Equation (6) and the definition of corresponding $U_k(t)$ given here apply to every k-dimensional cell cluster 36, respectively, during the cell scheduling. The difference is just that each cell cluster 36 with the same dimension of k may have different UEs 34 and different k associated cells 24, 30.

The available resource space for each $f_k(*)$ must also be defined. To do this, a priority is set for each $f_k(*)$. The priorities are used to decide the order in which each $f_k(*)$ is performed in scheduling. Three examples of the types of priorities may be assigned are now given. However, these are only examples. The first example is to set priority from the lowest to the highest in an increasing order of k; the second example is in a decreasing order of k; and the third example is to randomly pick up each $f_k(*)$ to perform in scheduling. Other prioritization schemes may alternatively be used.

Like the UE space, the resource space of each $f_k(*)$ should be a subset of the entire resource space $N_{SB}(t)$ available at time t for a cell 24, 30. It is denoted by $N_{SB,k}(t)$ and all of them should become an orthogonal partition of U(t), $$\text{i.e., } \bigcup_k N_{SB,k}(t) = N_{SB}(t).$$

To find out each $N_{SB,k}(t)$, two methods are considered herein:

In the first method, each $N_{SB,k}(t)$ is based on the priority of $f_k(*)$. Take the first type of priority given earlier as the example, i.e., the highest priority corresponds to the case of k=K. This guarantees that each cell edge UE has a fair opportunity to be scheduled under the maximum throughput strategy. This represents an improvement due to the technical innovation given by the present disclosure. If we let $N_{assigned-SB,k}(t)$ be the set of assigned SBs after $f_k(*)$ is performed where k=K, K−1, K−2, ..., 1 and assume that $N_{assigned-SB,K+1}(t)$ is an empty set, then $$N_{SB,K-i}(t) = N_{SB}(t) - \bigcup_{l=-1}^{i-1} N_{assigned-SB,K-l}(t), \quad (7)$$

$$i = 0, 1, 2, \ldots, K-1.$$

In the first method, each $N_{SB,k}(t)$ is based on the percentage of $U_k(t)$ over U(t). This method is performed before the operation of any $f_k(*)$ and the outcome is static within a TTI. If we let $v_k(t)$ be the percentage of $U_k(t)$ over U(t), then the number of SBs denoted by $|N_{SB,k}(t)|$ in each $U_{SB,k}(t)$ is $$|N_{SB,k}(t)| = v_k(t) \cdot |N_{SB}(t)| \quad (8)$$

Which $|N_{SB,k}(t)|$ SBs are taken from $N_{SB}(t)$ for $N_{SB,k}(t)$ depends on the maximum MCS data rate each UE in $U_k(t)$ can support on each SB in $SB_{SB}(t)$ in terms of its reported CQI values. The rule is to select those SBs in favor of each UE in $U_k(t)$ as much as possible in terms of MCS rate. After selection, the relevant information shall be sent by the cell 24, 30 to every associated cell 24, 30 in each cell cluster 36 for further cooperation between cells 24, 30 in the second step operation of the proposed DL CoMP scheduling algorithm.

In summary, with all the aspects of innovations and improvements given above, the maximum throughput based coordinated downlink scheduling algorithm can be expressed as:

$$f_k(J(x_u), A, B, p_1, p_2, \ldots, p_m) = \sum_{u \in U_k(t)} \sum_{n \in N_{SB,k}(t)} a_{u,n} \sum_{j=1}^{J_{max}(x_u)} b_{u,j} \cdot r_j \quad (9)$$

where $$J(x_u) = \{j_{u,max}(x_{u,n}) \mid n \in N_{SB,k}(t)\}, \quad (10)$$

$$A = \{a_{u,n} \mid u \in U_k(t), n \in N_{SB,k}(t)\}, \quad (11)$$

$$B = \{b_{u,j} \mid j = 1, 2, \ldots, J_{max}(x_u), u \in U_k(t)\}. \quad (12)$$

It should be pointed out that the $f_k(*)$ given in Equation (6) can be of any form in terms of scheduling strategies and criteria, even though it is not the focus of the present disclosure to specifically look for a new one.

Up to this point, the description in this section has been focused on the technical innovation made by the present disclosure on the conventional single cell scheduling so as to come up with the concrete methods for the first-step operation of the proposed DL CoMP scheduling algorithm. From now on, the description is going to switch to the second-step operation of the algorithm, which reflects another technical innovation made by the present disclosure. In particular, the description will now focus on the scheduled SBs of each UE 34 in a k-dimensional cell cluster 36 as k>1 and set a proper DL CoMP scheme for each scheduled UE 34 based on the resource SBs assigned to the UE 34. The second-step operation requires every associated cell 24, 30 in a k-dimensional cell cluster 36 to be involved. It works on the basis of the first-step operation of the algorithm.

To explain the second-step operation, it is desirable to further discuss the coordination between the k cells 24, 30 in a k-dimensional cell cluster 36. Taking the maximum throughput as the optimization criterion, let's look into the case of k=1 and the case of k>1, respectively. When k=1, all UEs 34 in $U_1(t)$ are associated with only one cell 24, 30, which is their serving cell. As mentioned earlier, these UEs 34 are cell center UEs relative to the cell 24, 30. To them, the inter-cell co-channel interference from any adjacent cell is not noticeable and can be ignored. Thus, the coordinated downlink resource scheduling as given in Equation (9) on the cell 24, 30 is degenerated into the conventional single cell scheduling on the unique one-dimensional cell cluster of the cell 24, 30. Under such a circumstance, the constraints for selection of the UE vector A and the MCS vector B is the same as that given in Equation (2) with the exception that the U(t) in Equation (2) has to be replaced by the $U_1(t)$ as given in Equations (11) and (12).

When k>1, k associated cells 24, 30 exist for all UEs 34 in $U_k(t)$, including one serving cell, which is the concerned cell 24, 30, as well as other k−1 adjacent cells 24, 30, which are able to affect the quality of their downlink signal reception. Thus, all UEs 34 in $U_k(t)$ are cell edge UEs corresponding to the concerned cell 24, 30. From Equation (9), the coordinated downlink scheduling on this concerned cell 24, 30 is split into a set of coordinated downlink scheduling operations, each on a k-dimensional cell cluster 36 where k=2, 3, . . . , K. The corresponding scheduling results are also specific to each k-dimensional cell cluster 36. They are useful to assist the further coordination between the cells 24, 30 in a k-dimensional cell cluster 36. As such, in the proposed distributed DL CoMP scheduling algorithm of some embodiments, the cell 24, 30 sends the scheduling information generated from the operation of each $f_k(*)$ to every associated cell 24, 30 in each cell cluster 36 via the corresponding macro or pico level coordinator 40, 44. If we let $MCS_{k,u}(j)$ represent the assigned MCS index and $SB_{k,u}(i_1)$, $SB_{k,u}(i_2)$, . . . , $SB_{k,u}(i_m)$ represent the assigned SBs assigned to UE(u) where m is the number of SBs, then the Scheduling Information (SI), which contains a set of Information Elements (IEs) for each UE 34 in $U_k(t)$ and is sent by the cell 24, 30 to every associated cell 24, 30 in a k-dimensional cell cluster 36, can be represented by $$SI_{c,k} = \{\{IE_{c,1,k}, IE_{c,2,k}, \ldots, IE_{c,u,k}\}, B_c\} \quad (13)$$

with $$IE_{c,u,k} = \{MCS_{c,u,k}(j), SB_{c,u,k}(i_1), SB_{c,u,k}(i_2), \ldots, SB_{c,u,k}(i_m)\}$$

where c represents the concerned cell 24, 30 in a k-dimensional cell cluster 36 and $B_c$ represents blank SBs which are not scheduled by the concerned cell 24, 30 to any UEs at TTI(t).

For the proportional fair based coordinated downlink scheduling, as mentioned earlier, the entire resource space $N_{SB}(t)$ does not need to be split into a set of subspaces since proportional fair based coordinated downlink scheduling provides a fair enough opportunity to every UE 34 in U(t) for scheduling. But after the first-step operation of the proportional fair based downlink scheduling on the concerned cell 24, 30, the scheduling information related to each UE in $U_k(t)$ is sent to all of the associated cells 24, 30 involved in each k-dimensional cell cluster 36 of the concerned cell 24, 30 for the second-step operation of the algorithm. Thus, Equation (13) is also applied to the second-step operation of proportional fair based coordinated downlink scheduling.

After the exchange of scheduling information between associated cells 24, 30 of every cell cluster 36 formed on the concerned cell 24, 30, as part of the second-step operation of the proposed algorithm, a proper DL CoMP scheme is set for each scheduled UE 34 in each k-dimensional cell cluster 36 based on the SBs assigned to the UE 34. As mentioned earlier, different DL CoMP schemes may have different requirements for downlink resource assignments. For simplicity, only the JP/JT scheme and the CS/CB scheme are considered in the present disclosure. However, additional or alternative DL CoMP schemes may be considered in a similar manner. For the JP/JT scheme, the requirement is that a same portion of frequency and time resources shall be assigned to all selected UE candidates in each k-dimensional cell cluster 36. For the CS/CB scheme, the requirement is that a different portion of frequency and time resources shall be assigned to a different selected UE candidate. Embodiments of the present disclosure allow mixed DL CoMP schemes to be used by UEs 34 simultaneously in a cell cluster 36. This provides substantial flexibility for the DL CoMP scheduling schemes disclosed herein. The details are explained as follows.

It is assumed that a group of cells 24, 30 named as $C=\{C_1, C_2, \ldots, C_k\}$ are associated with $U_{k,C_1}(t)=\{UE_{C_1,1}, UE_{C_1,2}, \ldots, UE_{C_1,X}\}$, $U_{k,C_2}(t)=\{UE_{C_2,1}, UE_{C_2,2}, \ldots, UE_{C_2,Y}\}, \ldots$, and $U_{k,C_k}(t)=\{UE_{Ck,1}, UE_{Ck,2}, \ldots, UE_{Ck,Z}\}$ in a k-dimensional cell cluster 36 on the concerned cell 24, 30 denoted by $C_1$, where $U_{k,C_1}(t)$ is the UE space of a k-dimensional cell cluster 36 seen from $C_1$ with X UEs served by $C_1$; so is $U_{k,C_2}(t)$ with Y UEs served by $C_2$; and $U_{k,C_k}(t)$ with Z UEs served by $C_k$, where X, Y, and Z are any integers. After the scheduling information exchange between these cells as described above, each cell $\{C_1,$ $C_2, \ldots, C_K\}$ has a global picture about the scheduling information about every UE 34, which can be expressed in terms of Equation (13) as:

$$SI_k = \{SI_{c_n,k} | c_n = C_1, \ldots, C_k\}. \quad (14)$$

This means that a cell cluster 36 has k associated cells 24, 30 and $SI_{c1,k}, SI_{c2,k}, \ldots, SI_{c_k,k}$ collectively denoted as $SI_k$ are generated and exchanged among the associated cells 24, 30 in the cell cluster 36. Each $SI_{c_n,k}$ in $SI_k$ contains 0 or more UE scheduling information element $IE_{c_n,u,k}$ as well as a set of unscheduled SBs denoted by $B_{Cn}$.

Each $IE_{c_n,u,k}$ defined in Equation (13) contains of one of a set of scheduling parameters for each UE(u) 34 of each cell 20, 30 in a k-dimensional cell cluster 36, and includes scheduling information generated from the initial CoMP scheduling performed by each cell 24, 30. In the example shown in Equation (13), the scheduling information includes an MCS index assigned to the UE(u), a set of SB indices (indices indicative of SBs scheduled for the UE(u)), and/or a set of unscheduled SBs. However, the scheduling information is not limited to such and may include additional or different parameters associated with downlink transmissions scheduled for each particular UE(u). Also, the scheduling information may be expressed in any suitable (digital) format (e.g., a bit-wise or byte-wise expression), and selected based on, for example, the desired signaling efficiency and message reliability. After the scheduling information exchange, each cell 24, 30 in a cell cluster 36 has a full set of scheduling information denoted by $SI_k$. In some implementations, in order to reduce the number of exchanged messages, all $SI_{c_n,k}$ with different k but being sent to the same destination can be aggregated into a single message and sent out to each associated cell 24, 30 across the heterogeneous network 22. Now, a description of the entire operational procedure of the proposed DL CoMP scheduling algorithm from the standpoint of each k-dimensional cell cluster 36 dynamically formed on a concerned cell 24, 30 is provided. The concerned cell 24, 30 is either a macro cell 24 or a pico cell 30. As mentioned earlier, the entire operation of the proposed scheduling algorithm includes two major steps. As the first step of the DL CoMP scheduling procedure, each UE 34 is scheduled by its serving cell 24, 30 in a formed k-dimensional cell cluster 36. Then, as the second step, the scheduling information exchanged between the associated cells denoted by $\{SI_{c_n,k}\}$ is taken as the input to produce a final scheduling decision for every scheduled UE 34 in each cell cluster 36. The final scheduling decision is expressed by two sets of SBs for each scheduled UE 34. One set contains the SBs scheduled for the UE 34 using DL CoMP JP/JT transmission mode, and the other set contains the SBs scheduled for the UE using DL CoMP CS/CB transmission mode.

Figure 4A:
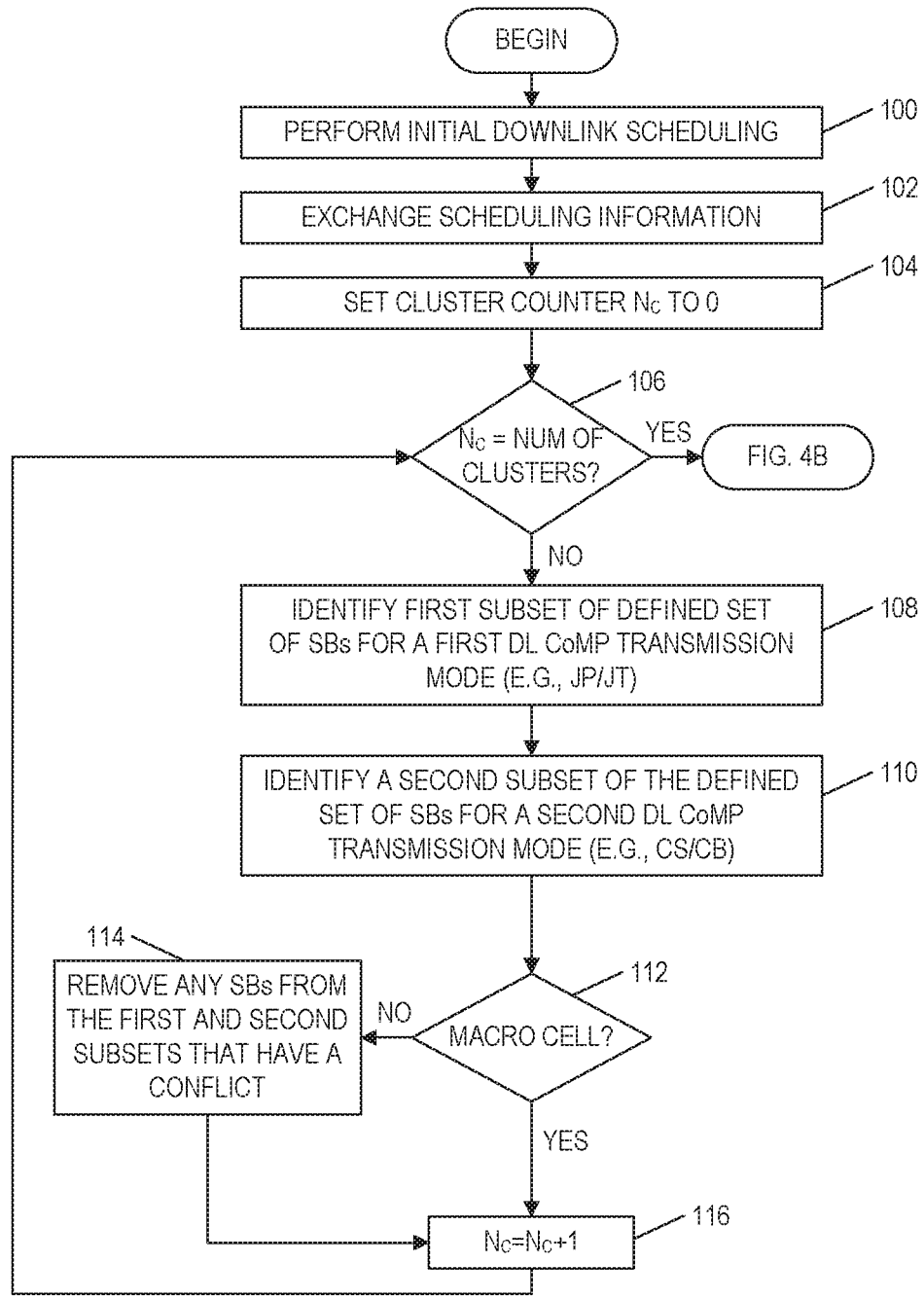
FIGS. 4A and 4B illustrate a distributed DL CoMP scheduling procedure according to some embodiments of the present disclosure.
Figure 4B:
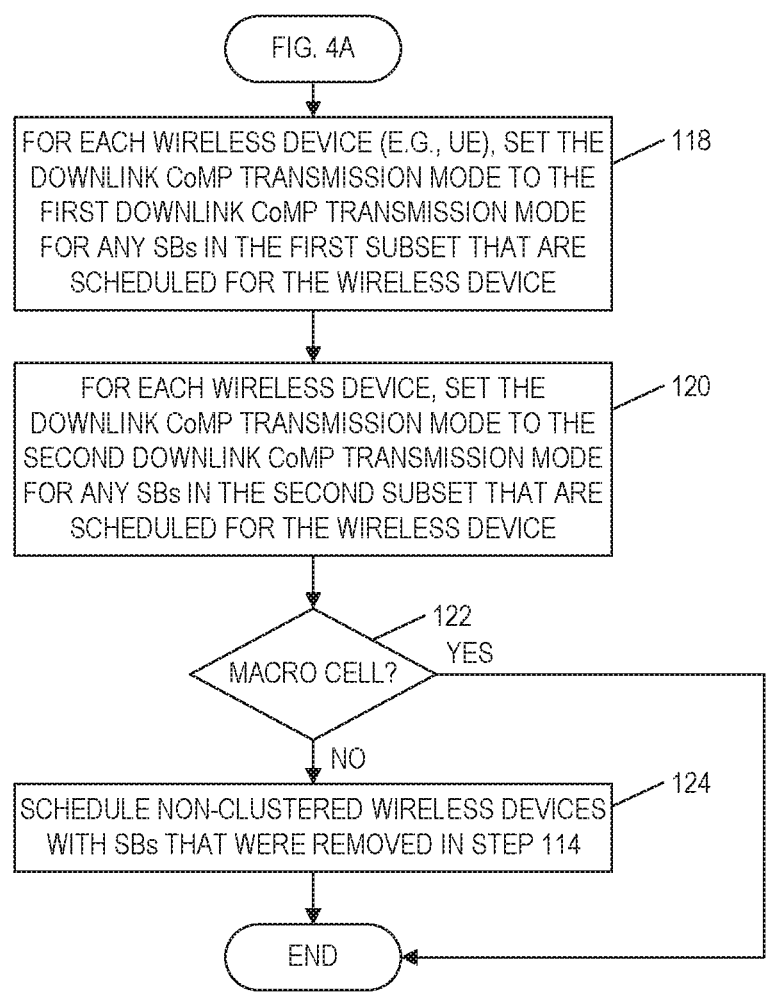

FIGS. 4A and 4B illustrate the DL CoMP scheduling procedure according to some embodiments of the present disclosure. This procedure is performed for each cell 24, 30 in a cell cluster 36 by the corresponding scheduler 42, 46 and coordinator 40, 44. In this discussion, the second-step operation is split into several tasks performed after the first-step operation. During the second-step operation, every pico cell 30 in each cell cluster 36 uses the scheduling information $SI_{c_n,k}$ received from the macro cell 24 as the reference information when it is about to make a final scheduling decision for each scheduled UE 34. This is the major difference between the macro cell scheduling and the pico cell scheduling.

As illustrated, the downlink scheduler 42, 46 performs initial downlink scheduling (step 100). At this step, the downlink scheduler 42, 46 for the concerned cell 24, 30 schedules a set of UEs 34 that are selected from all active UEs 34 served by the concerned cell 24, 30 based on a scheduling method such as the proportional fair algorithm or the maximum throughput algorithm discussed previously. As a result of the initial downlink scheduling, each scheduled UE 34 is assigned an appropriate MCS and a set of SBs (i.e., a set of one or more SBs).

Next, for each k-dimensional cell cluster 36, the downlink scheduler 42, 46 exchanges scheduling information with the other associated cells 24, 30 in that cell cluster 36 (step 102). More specifically, a scheduling information message $SI_{c_n,k}$ is composed for each cell of a k-dimensional cell cluster 36, where k=2, . . . , K, according to Equation (13). For each k-dimensional cell cluster 36, the downlink scheduler 42, 46 of each cell sends its scheduling information messages $SI_{c_n,k}$ to the associated cells 24, 30 in that cell cluster 36 via the appropriate coordinators 38, 40, and 44. Likewise, the downlink scheduler 42, 46 of each cell of a k-dimensional cell cluster also receives, from the associated cells 24, 30 in each cell cluster 36, all scheduling information messages denoted by $\{SI_{c_n,k}\}$ generated by the downlink schedulers 42, 46 of the other cells 24, 30 in that cell cluster 36 via the corresponding coordinators 38, 40, 44. Here, k>1 and each k-dimensional cell cluster 36 by definition has a unique set of k associated cells 24, 30. For example, the cell $c_n$ in the cell cluster k sends the $SI_{c_n,k}$ to each other associated cell with an index of $c \varepsilon C_{k \neq n} = \{c_i | i=2, \ldots, k \text{ and } c_i \neq c_n\}$ in the cell cluster 36, and receives a set of messages denoted by $\mathbb{S}_k = \{SI_{c,k} | c \varepsilon C_{k \neq n}\}$ from other associated cells.

Next, in steps 104 through 116, the downlink scheduler 42, 46 builds a set of SBs for a first DL CoMP transmission mode, which in this example is the JP/JT transmission mode, and a second set of SBs for a second DL CoMP transmission mode, which in this example is the CS/CB transmission mode. The first and second sets of SBs are disjoint subsets of a set of available SBs for the TTI.

In general, in this example, steps 104 through 116 are performed by the downlink scheduler 42, 46 to determine a set of SBs for JP/JT and a set of SBs for CS/CB. In these steps, the downlink scheduler 42, 46 checks and compares each own UE's scheduling information with each scheduling information received from the other associated cells 24, 30 by looking into each $SI_{c,k}$ message in $\mathbb{S}_k$ and then adding each SB scheduled for the UE 34 into either the JP/JT related SB set or the CS/CB related SB set. The manner in which the JP/JT and CS/CB SB sets are determined is slightly different depending on whether the concerned cell 24, 30 is a macro cell 24 or a pico cell 30. As discussed below, some additional steps are required for a pico cell 30 to avoid scheduling conflicts between overlapping cell clusters 36 from the macro cell 24 standpoint.

In some embodiments, only one cell 24, 30 runs the macro cell algorithm. In those embodiments, for cell clusters 36 that only contain pico cells 30 or cell clusters 36 that contain more than one macro cell 24, only one cell 24, 30 runs the macro cell algorithm. This cell 24, 30 may also be referred to herein as a "reference cell." In other embodiments, for cell clusters 36 that contain only pico cells 30, the pico cell 30 with the lowest global cell index runs the macro cell algorithm and, for cell clusters 36 that contain more than one macro cell 24, the macro cell 24 with the lowest global cell index runs the macro cell algorithm and the other macro cell(s) 24 run the pico cell algorithm.

In particular, as illustrated, the downlink scheduler 42, 46 sets a cell cluster counter $N_C$ to zero (step 104) and then determines whether the cell cluster counter $N_C$ is equal to the number of cell clusters 36 to be processed (step 106). If not, the downlink scheduler 42, 46 identifies a first subset of a defined set of SBs (e.g., a set of all available SBs for a TTI) for a first DL CoMP transmission mode (e.g., JP/JT) (step 108) and identifies a second subset of the defined set of SBs for a second DL CoMP transmission mode (e.g., CS/CB) (step 110). The first and second subsets of the defined set of SBs are disjoint subsets. More specifically, for JP/JT and CS/CB, if a SB is scheduled by the concerned cell 24, 30 and the SB is also scheduled for UEs 34 served by other associated cells 24, 30 in the cell cluster 36, the SB is added to the JP/JT SB set. The condition is indicated by the fact that this SB is in one or more $SI_{c,k}$ messages in $\mathbb{S}_k$. Conversely, if a SB is scheduled by the concerned cell 24, 30 and the SB is not scheduled by other associated cells 24, 30 in the cell cluster 36, this SB is added to the CS/CB SB set. This condition is indicated by the fact that this SB is not in any $SI_{c,k}$ messages in $\mathbb{S}_k$.

A determination is made as to whether the concerned cell 24, 30 is a macro cell 24 (or conversely a pico cell 30) (step 112). If the concerned cell 24, 30 is a macro cell 24, the downlink scheduler 42 increments the cell cluster counter $N_C$ (step 116) and then the process returns to step 106 and is repeated. If the concerned cell 24, 30 is not a macro cell 24 (i.e., the concerned cell 24, 30 is a pico cell 30), the downlink scheduler 46 then removes any SBs from the first and second subsets (e.g., the JP/JT set and the CS/CB set) that have a conflict (step 114). More specifically, for the JP/JT and CS/CB example, for each SB in the JP/JT set, if this SB is scheduled by the macro cell 24 or if the SB is in a blank set of the macro cell 24, the SB is kept in the JP/JT set (i.e., there is no conflict for this SB). This condition is indicated by the fact that this SB is in the macro $SI_{c,k}$ information element or a blank set. Otherwise, the downlink scheduler 46 removes this SB from the JP/JT set. Upon removal, the SB is added to a dropped SB set. For each SB in the CS/CB set, if that SB is not scheduled by the macro cell 24, the downlink scheduler 46 keeps the SB in the CS/CB set. This condition is indicated by the fact that this SB is in the macro $SI_{c,k}$ blank set. Otherwise, the downlink scheduler 46 removes this SB from the CS/CB set. Again, upon removal, the SB is added to the dropped set. As discussed below, for each SB in the dropped set, if possible, the downlink scheduler 46 schedules the SB for a non-clustered UE, i.e., a cell-center UE, in the corresponding pico cell 30.

To formalize the above operations, the following symbols are defined:

$S_{s,k}$—A set of SBs scheduled for UEs by a serving cell of s in a cell cluster of k. It is in fact the $\{SB_{s,k}\}$ of all information elements with respect to u in the $SI_{s,k}$ of the serving cell in Equation (13).

$S_d$—A set of SBs dropped out from all $S_{s,k}$ as result of the scheduling operations.

$S_{CS,k}$—A set of SBs from $S_{s,k}$ that can be used for CB/CS transmission.

$S_{JT,k}$—A set of SBs from $S_{s,k}$ that can be used for JP/JT transmission.

Assume that there are k cells in the cell cluster and k–1 $SI_{c,k}$ messages from other associated cells.

$S_{c,k}$—A subset of SBs of $SI_{c,k}$, $c=C_1, \ldots, C_K$, $c \neq s$.

$B_m$—A set of SBs that is not scheduled by a macro cell, i.e. the blank SB set.

$S_{c_m,k}$—A set of SBs that is scheduled by the macro cell.

Figure 5:
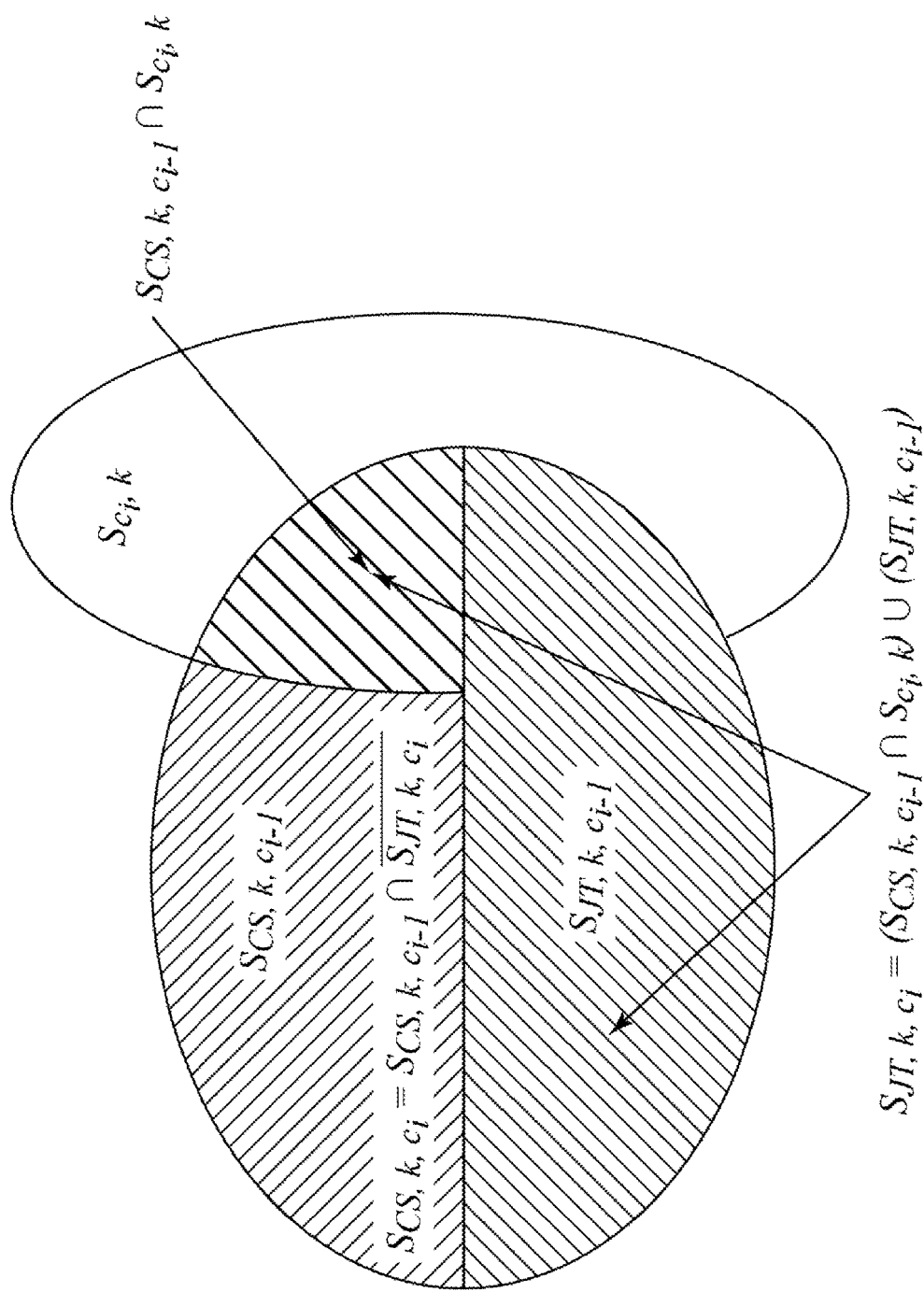
FIG. 5 graphically illustrates a set operation used to determine different sets of scheduling blocks for different DL CoMP transmission modes according to some embodiments of the present disclosure.

With all of these defined symbols, steps 104 through 116 can be described with a series of iterative set operations for both a macro cell 24 and a pico cell 30 as depicted by a graphical view seen from a macro cell 24 and a pico cell 30 shown in FIG. 5. Some additional operations are required for a pico cell 30. The operations shown in FIG. 5 can be described for a single cell cluster 36 by using the pseudo code as below:

Initialize the total dropped out SB set to empty by $S_d = \emptyset$,
For each cell cluster:
  Let $S_{CS,k,0} = S_{s,k}$ to initialize the CS/CB related SB set to contain all scheduled SBs assigned by the first-step operation of the algorithm.
  Initialize $S_{JT,k,0} = \emptyset$, i.e., set the JT related SB set to empty, then start loop through $S_{c_i,k}$ from associated cells in the cell cluster.
  For each associated cell, $c_i = C_1, \ldots, C_K$, $C_i \neq s$:

$S_{JT,k,c_i} = (S_{CS,k,c_{i-1}} \cap S_{c_i,k}) \cup (S_{JT,k,c_{i-1}})$ $S_{CS,k,c_i} = S_{CS,k,c_{i-1}} \cap \overline{S_{JT,k,c_i}}$ End for the associated cell loop.
  After the loop on all scheduling information received from associated cells, set the final scheduling decisions for the UE served by the cell for the cell cluster:

$S_{JT,k} = S_{JT,k,C_k}$ $S_{CS,k} = S_{CS,k,C_k}$

If the cell global index s indicates this is a pico cell, additional operations are required by the pico cells to find out those scheduled SBs that are conflict with the macro cell. Those SBs are removed from the pico cells JT or CS set and added to the dropped SB set $S_d$:

$S_{JT,k} = (S_{JT,k} \cap S_{c_m,k}) \cup (S_{JT,k} \cap B_m)$ $S_{CS,k} = S_{CS,k} \cap B_m$ $S_d = \overline{(S_{JT,k} \cup S_{CS,k})} \cap S_{s,k}$ End if
End for the cluster loop Returning to FIGS. 4A and 4B, at step 106, once the last cell cluster 36 has been processed (i.e., once the cell cluster counter $N_C$ is equal to the number of cell clusters 36 to be processed), for each wireless device, or UE 34, associated with any of the processed cell clusters 36, the downlink scheduler 42, 46 of the concerned cell 24, 30 sets the UE 34 to the first DL CoMP transmission mode (e.g., JP/JT) for any SBs scheduled for the UE 34 that are in the first subset (e.g., the JP/JT set) (step 118). Likewise, for each wireless device, or UE 34, associated with any of the processed cell clusters 36, the downlink scheduler 42, 46 of the concerned cell 24, 30 sets the UE 34 to the second DL CoMP transmission node (e.g., CS/CB) for any SBs scheduled for the UE 34 that are in the second subset (e.g., the CS/CB set) (step 120). More specifically, for the JP/JT and CS/CB example, for each UE 34, if the associated $S_{JT,k}$ SB set is not empty, set the DL CoMP transmission mode to JP/JT for those SBs. For each UE 34, if its associated $S_{CS,k}$ SB set is not empty, set the DL CoMP transmission mode to CB/CS for those SBs.

A determination again is made as to whether the concerned cell 24, 30 is a macro cell 24 or a pico cell 30 (step 122). If the concerned cell 24, 30 is a macro cell 24, the process ends. Otherwise, the downlink scheduler 46 schedules cell-center wireless devices, or UEs 34 in the one-dimensional cell cluster, with SBs that were removed in step 114 (i.e., the SBs in the dropped set), if possible (step 124). In other words, if $S_d$ is not empty, this indicates that scheduling collisions occur with the associated macro cell 24. As such, the SBs in $S_d$ are SBs dropped from the JP/JT or CS/CB sets in step 114. If possible, the dropped SBs are rescheduled for any cell-center UEs 34 in order to increase the cell throughput and avoid inter-cell co-channel interference at the same time. Note that, for any macro cell 24, $S_d$ should always be empty.

Importantly, after scheduling is complete, each cell 24, 30 will transmit to the scheduled UEs 34 the control signaling about the scheduled SBs and the configured DL CoMP transmission mode (if any) through the downlink control channel as well as the corresponding DL CoMP data streams through the downlink traffic channel. These downlink transmissions are performed in the conventional manner other than the fact that the SBs and the DL CoMP transmission modes are selected according to any of the embodiments of the distributed DL CoMP scheme disclosed herein.

Figure 6:
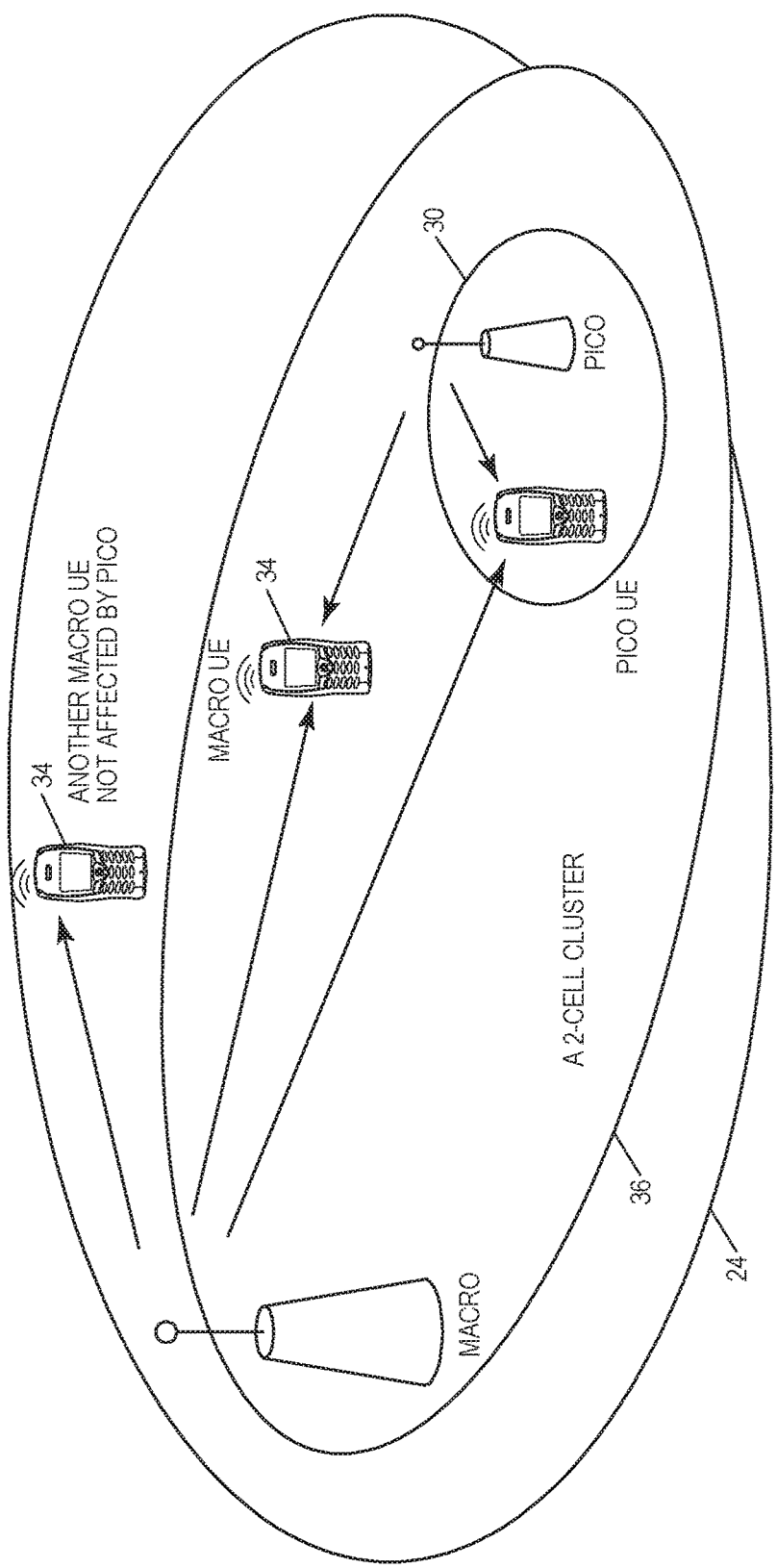
FIGS. 6 and 7 illustrate a first example of the DL CoMP scheduling procedure of FIGS. 4A and 4B according to some embodiments of the present disclosure.

Now, two examples are given to show examples of a distributed cluster-wide joint DL CoMP scheduling according to some embodiments of the present disclosure. The first example is a simple case as shown in FIG. 6, in which, there is only one two-dimensional cell cluster 36 which consists of the macro cell 24 denoted by m and the pico cell 30 denoted by p as well as one macro UE 34 denoted by $UE_m$ and one pico UE 34 denoted by $UE_p$. It is assumed that the two UEs 34 are in a connected state or mode (e.g., RRC_CONNECTED) and report CQI or other channel quality values to their serving cells 24, 30, respectively, for every downlink SB in the system. According to the dynamic multi-cell clustering algorithm, the two-dimensional cell cluster 36 is formed as follows.

First, after receiving RSRP reports from every served UE 34, each serving cell 24, 30 creates a RSRP list for each of its served UEs 34. Then, the created RSRP lists are sorted out and truncated by each serving cell 24, 30 to keep those RSRP values greater than the threshold $T_{RSRP}$. The results are as below:

Macro:

$$L(UE_m)=\{rsrp(m), rsrp(p)\}.$$

Pico:

$$L(UE_p)=\{rsrp(p), rsrp(m)\}.$$

Next, each serving cell 24, 30 classifies its served UEs 34 into a k-dimensional UE constellation denoted by A(k), where k=2 for the scenario here, with the outcomes:

Macro:

$$A(2)=\{UE_m\}$$

Pico:

$$A(2)=\{UE_p\}.$$

Next, each serving cell 24, 30 further classifies UEs 34 in each A(k) into each k-dimensional UE group where k=2, in terms of each unique group of associated cells 24, 30. In order to emphasize the ownership of each serving cell 24, 30 on each created k-dimensional group, the expression $G_x(i_1, i_2, \ldots, i_k)=G(i_1, i_2, \ldots, x, \ldots, i_k)$ is introduced to express the outcomes as listed below:

Macro:

$$G(m,p)=\{UE_m\}=G_m(p)$$

Pico:

$$G(p,m)=\{UE_p\}=G_p(m)$$

At this time, each serving cell 24, 30 only has a local picture about the created k-dimensional UE groups.

Each serving cell 24, 30 then exchanges this information with associated cells 24, 30 by inter-cell communication via the corresponding macro level coordinator 40 and/or the corresponding pico level coordinator 44. Afterwards, the outcomes for each serving cell 24, 30 are:

Macro:

$$G_m(p)=\{UE_m\}$$

$$G_p(m)=\{UE_p\}$$

Pico:

$$G_p(m)=\{UE_p\}$$

$$G_m(p)=\{UE_m\}$$

It is clear that after the inter-cell communication, each serving cell 24, 30 obtains a global picture of various k-dimensional UE groups.

In the final step of the dynamic multi-cell clustering, each cell 24, 30 merges all k-dimensional groups which have a same group of associated cells 24, 30 into a k-dimensional cell cluster 36. The outcomes are:

Macro:

$$U_{CoMP}(m,p)=\{UE_m, UE_p\}$$

Pico:

$$U_{CoMP}(p,m)=\{UE_m, UE_p\}$$

The results show that a unique two-dimensional cell cluster 36 is formed and known by the macro cell 24 and the pico cell 30, respectively. In the following, the operation of the DL CoMP scheduling procedure is described for the macro cell 24 and the pico cell 30 involved in the formed cell cluster 36, taking the proportional fair based DL CoMP scheduling algorithm as the example for the scheduling.

For the macro cell 24, it is assumed that at TTI(t), the UE space denoted by U(t), the set of maximum MCS indices denoted by $\{j_{u,max}(x_{u,n})|u\in U(t), n\in N_{SB}(t)\}$, and each scheduled SB taken from the resource space denoted by $N_{SB}(t)$ are given, where $U(t)=\{UE_m\}$ and $N_{SB}(t)=\{SB1, SB2, SB3, SB4, SB5\}$. It is also assumed that in the initial cell scheduling, i.e., the first-step operation of the algorithm, the optimization problem $P_2$ is performed at TTI(t) based on Equation (3) and the outcomes are $A=\{\{1, 1, 1, 0, 0\}\}_{(u\times n)}$ and $B=\{\{0,0,0,1,0\}\}_{(u\times j)}$, where $J_{max}=5$. This means that $UE_m$ is scheduled for SB1, SB2, and SB3 with a MCS index of 4 as shown in the upper-left part of FIG. 7.

For the pico cell 30, it is assumed that at TTI(t), the UE space denoted by U(t), the set of maximum MCS indices denoted by $\{j_{u,max}(x_{u,n})|u\in U(t), n\in N_{SB}(t)\}$ and each scheduled SB taken from the resource space denoted by $N_{SB}(t)$ are given, where $U(t)=\{UE_p\}$ and $N_{SB}(t)=\{SB1, SB2, SB3, SB4, SB5\}$. It is also assumed that in the initial cell scheduling, i.e., the first-step operation of the algorithm, the optimization problem $P_2$ is performed at TTI(t) based on Equation (3) and the outcomes are $A=\{\{1, 1, 1, 1, 1\}\}_{(u\times n)}$ and $B=\{\{0,0,1,0,0\}\}_{(u\times j)}$, where $J_{max}=5$. This means that the pico UE is scheduled for SB1, SB2, SB3, SB4, and SB5 with a MCS index of 3 as shown in the upper-right part of FIG. 7.

Figure 7:
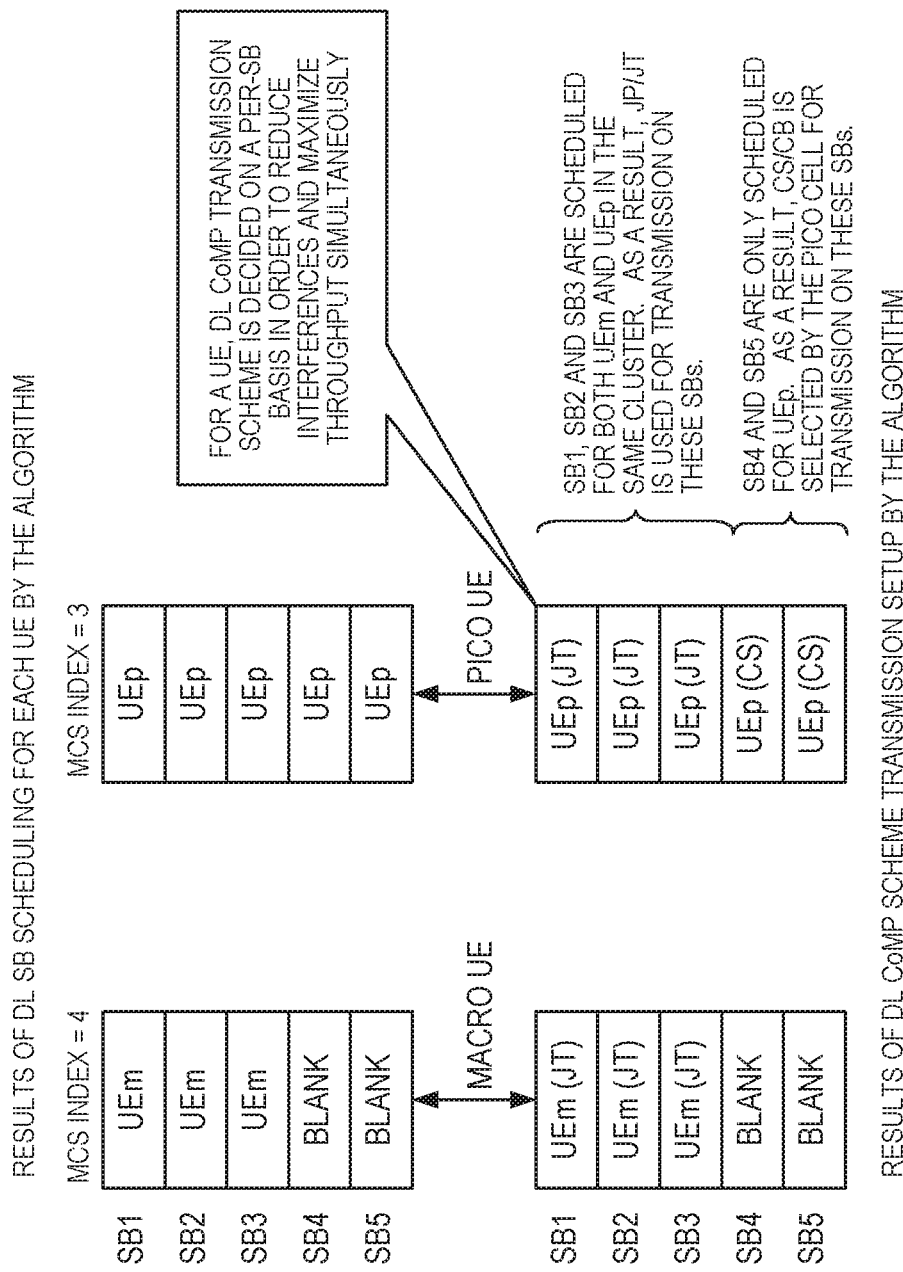

Referring to the lower part of FIG. 7, according to the algorithm given above, the two scheduled UEs use the same JP/JT DL CoMP scheme for transmission of their data on SB1, SB2, and SB3. As for SB4 and SB5, only the pico UE is scheduled on those SBs and, therefore, the CS/CB scheme is selected by the pico cell 30. Thus, by applying the algorithm, the inter-cell co-channel interference between the two UEs 34 served by the macro cell 24 and the pico cell 30 in the cell cluster 36 can be eliminated with the properly set DL CoMP schemes over the air. In addition to that, it naturally allows mixed JP/JT and CS/CB transmissions for the same UE 34 in the cell cluster 36 whenever possible. All of this greatly increases downlink throughputs for each cell 24, 30 and each UE 34 in the cell cluster 36.

The second example is quite comprehensive, including a one-dimensional cell cluster 36, two overlapped three-dimensional cell clusters 36, and a number of UEs 34 served by the associated cells 24, 30 in each cell cluster 36. Using the macro cell 24-2 of FIG. 2 as an example, without loss of generality, it is assumed that the macro cell 24-2 is serving four UEs 34 as named in FIG. 2; and the pico cells 30-5, 30-6, 30-7, and 30-8 are distributed over the macro cell 24-2, each serving one UE 34 as named in FIG. 2 as well. All the UEs 34 are in a connected state or mode (e.g., RRC_CONNECTED) and report CQI or other channel quality values to their serving cells 24, 30, respectively, for every resource SB in the system. According to the dynamic multi-cell clustering algorithm, the cell cluster 36-3 is associated with the macro cell 24-2 denoted by m2, the pico cell 30-5 denoted by p5 and the pico cell 30-6 denoted by p6; and the cell cluster 36-4 is associated with the macro cell 24-2, the pico cell 30-7 denoted by p7 and the pico cell 30-8 denoted by p8. Another cell cluster 36 is of one dimension and formed by the macro cell 24-2 and the macro UE 34-14, where this cell cluster 36 is not explicitly shown in FIG. 2. For this discussion, this cell cluster 36 is referred to as the cell cluster 0. Going through the same procedure as described above, the cell cluster 0, the cell cluster 3, and the cell cluster 4 can be formed as follows.

First, after receiving RSRP reports from every served UE 34, each serving cell 24, 30 creates a RSRP list for each of its served UEs 34. Then, the created RSRP lists are sorted out and truncated by each serving cell 24, 30 to keep those RSRP values greater than the threshold $T_{RSRP}$. The results are as below:

Macro 2:

$L(UE1_{m2})=\{rsrp(m2)\}$ $L(UE2_{m2})=\{rsrp(m2),rsrp(p5),rsrp(p6)\}.$ $L(UE3_{m2})=\{rsrp(m2),rsrp(p6),rsrp(p5)\}$ $L(UE4_{m2})=\{rsrp(m2),rsrp(p7),rsrp(p8)\}$ Pico 5:

$L(UE_{p5})=\{rsrp(p5),rsrp(m2),rsrp(p6)\}.$

Pico 6:

$L(UE_{p6})=\{rsrp(p6),rsrp(m2),rsrp(p5)\}.$

Pico 7:

$L(UE_{p7})=\{rsrp(p7),rsrp(m2),rsrp(p8)\}.$

Pico 8:

$L(UE_{p8})=\{rsrp(p8),rsrp(m2),rsrp(p7)\}.$

Next, each cell 24, 30 classifies its served UEs 34 into a k-dimensional UE constellation denoted by A(k) where k=1 and 3 for the scenario herein, with the outcomes:

Macro 2:

$A(1)=\{UE1_{m2}\}$ $A(3)=\{UE2_{m2},UE3_{m2},UE4_{m2}\}$

Pico 5:

$A(3)=\{UE_{p5}\}.$

Pico 6:

$A(3)=\{UE_{p6}\}.$

Pico 7:

$A(3)=\{UE_{p7}\}.$

Pico 8:

$A(3)=\{UE_{p8}\}$

Each serving cell 24, 30 then further classifies UEs 34 in each A(k) into each k-dimensional UE group where k=1 and 3, in terms of each unique group of associated cells 24, 30. In order to emphasize the ownership of each serving cell 24, 30 on each created k-dimensional group, the expression $G_x(i_1, i_2, \ldots, i_k)=G(i_1, i_2, \ldots, x, \ldots, i_k)$ is introduced to express the outcomes as listed below:

Macro 2:

$G(m2)=\{UE_{m2}\}=G_{m2}$ $G(m2,p5,p6)=\{UE2_{m2},UE3_{m2}\}=G_{m2}(p5,p6)$ $G(m2,p7,p8)=\{UE4_{m2}\}=G_{m2}(p7,p8)$

Pico 5:

$G(p5,m2,p6)=\{UE_{p5}\}=G_{p5}(m2,p6)$

Pico 6:

$G(p6,m2,p5)=\{UE_{p6}\}=G_{p6}(m2,p5)$

Pico 7:

$G(p7,m2,p8)=\{UE_{p7}\}=G_{p7}(m2,p8)$

Pico 8:

$G(p8,m2,p7)=\{UE_{p8}\}=G_{p8}(m2,p7)$

At this time, each serving cell 24, 30 only has a local picture about the created k-dimensional UE groups.

Next, each serving cell 24, 30 exchanges this information with associated cells 24, 30 by inter-cell communication via the corresponding macro level coordinator 40 and/or the corresponding pico level coordinator 44. Afterwards, the outcomes for each serving cell 24, 30 are:

Macro 2:

$G_{m2}=\{UE1_{m2}\}$ $G_{m2}(p_5,p6)=\{UE2_{m2},UE3_{m2}\}$ $G_{m2}(p7,p8)=\{UE4_{m2}\}$ $G_{p5}(m2,p6)=\{UE_{p5}\}$ $G_{p6}(m2,p5)=\{UE_{p6}\}$ $G_{p7}(m2,p8)=\{UE_{p7}\}$ $G_{p8}(m2,p7)=\{UE_{p8}\}$

Pico 5:

$G_{m2}(p5,p6)=\{UE2_{m2},UE3_{m2}\}$ $G_{p5}(m2,p6)=\{UE_{p5}\}$ $G_{p6}(m2,p5)=\{UE_{p6}\}$

Pico 6:

$G_{m2}(p5,p6)=\{UE2_{m2},UE3_{m2}\}$ $G_{p5}(m2,p6)=\{UE_{p5}\}$ $G_{p6}(m2,p5)=\{UE_{p6}\}$

Pico 7:

$G_{m2}(p7,p8)=\{UE4_{m2}\}$ $G_{p7}(m2,p8)=\{UE_{p7}\}$ $G_{p8}(m2,p7)=\{UE_{p8}\}$

Pico 8:

$G_{m2}(p7,p8)=\{UE4_{m2}\}$ $G_{p7}(m2,p8)=\{UE_{p7}\}$ $G_{p8}(m2,p7)=\{UE_{p8}\}$

It is clear that after the inter-cell communication, each serving cell 24, 30 obtains a global picture of various k-dimensional UE groups related to it.

In the final step of the dynamic multi-cell clustering algorithm, each cell 24, 30 merges all k-dimensional groups which have a same group of associated cells into a k-dimensional cell cluster 36. The outcomes are:

Macro 2:

$U_{CoMP}(m2)=\{UE1_{m2}\}$ (i.e. the cell cluster 0.)

$U_{CoMP}(m2,p5,p6)=\{UE2_{m2},UE3_{m2},UE_{p5},UE_{p6}\}$ (i.e., the cell cluster 3.)

$U_{CoMP}(m2,p7,p8)=\{UE4_{m2},UE_{p7},UE_{p8}\}$ (i.e., the cell cluster 4.)

Pico 5:

$U_{CoMP}(p5,m2,p6)=\{UE2_{m2},UE3_{m2},UE_{p5},UE_{p6}\}$ (i.e., the cell cluster 3.)

Pico 6:

$U_{CoMP}(p6,m2,p5)=\{UE2_{m2},UE3_{m2},UE_{p5},UE_{p6}\}$ (i.e., the cell cluster 3.)

Pico 7:

$U_{CoMP}(p7,m2,p8)=\{UE4_{m2},UE_{p7},UE_{p8}\}$ (i.e., the cell cluster 4.)

Pico 8:

$U_{CoMP}(p8,m2,p7)=\{UE4_{m2},UE_{p7},UE_{p8}\}$ (i.e., the cell cluster 4.)

The results show that for the macro cell 24-2, three cell clusters 36 are formed, which are the cell cluster 36-0 (i.e., cell cluster 0), the cell cluster 36-3, and the cell cluster 36-4. Specifically, the cell cluster 36-3 is formed to consist of the macro cell 24-2, the pico cell 30-5, and the pico cell 30-6. The cell cluster 36-4 is formed to consist of the macro cell 24-2, the pico cell 30-7, and the pico cell 30-8.

In the following, the operation of the disturbed DL CoMP scheduling is described for the macro cell 24-2 and the pico cells 30-5, 30-6, 30-7, and 30-8 in terms of the created cell clusters 36-0, 36-3, and 36-4, taking the proportional fair based DL CoMP scheduling algorithm as the example for scheduling.

For the macro cell 36-2, it is assumed that at TTI(t), the UE space denoted by U(t), the maximum MCS index set denoted by $\{j_{u,max}(x_{u,n})|u \in U(t), n \in N_{SB}(t)\}$ and each SB taken from the resource space denoted by $N_{SB}(t)$ are given, where $U(t)=\{UE1_{m2}, UE2_{m2}, UE3_{m2}, UE4_{m2}\}$ and $N_{SB}(t)=\{SB1, SB2, SB3, SB4\}$. It is also assumed that in the initial cell scheduling, i.e., the first-step operation of the algorithm, the optimization problem $P_2$ is performed at TTI(t) based on Equation (3) and the outcomes are A={{1, 0, 0, 0}, {0, 1, 0, 0}, {0, 0, 0, 0}, {0, 0, 1, 0}}$_{(u \times n)}$ and B={{0,0,0,1,0}, {0,0,0,0,0}, {0,0,0,1,0}}$_{(u \times j)}$, where $J_{max}=5$. This means that UE1 is scheduled for SB1 with a MCS index of 4; UE2 is scheduled for SB2 with a MCS index of 3; UE3 is not scheduled; and UE4 is scheduled for SB3 with a MCS index of 4.

For the pico cell 30-5, it is assumed that at TTI(t), the UE space denoted by U(t), the maximum MCS index set denoted by $\{j_{u,max}(x_{u,n})|u \in U(t), n \in N_{SB}(t)\}$ and each SB taken from the resource space denoted by $N_{SB}(t)$ are given, where $U(t)=\{UE_{p5}\}$ and $N_{SB}(t)=\{SB1, SB2, SB3\}$. It is also assumed that in the initial cell scheduling, i.e., the first-step operation of the algorithm, the optimization problem $P_2$ is performed at TTI(t) based on Equation (3) and the outcomes are A={{1, 1, 0}}$_{(u \times n)}$ and B={{0,0,1,0,0}}$_{(u \times j)}$, where $J_{max}=5$. This means that the pico cell 30-5 UE is scheduled for SB1 and SB2 with a MCS index of 3.

For the pico cell 30-6, it is assumed that at TTI(t), the UE space denoted by U(t), the maximum MCS index set denoted by $\{j_{u,max}(x_{u,n})|u \in U(t), n \in N_{SB}(t)\}$ and each SB taken from the resource space denoted by $N_{SB}(t)$ are given, where $U(t)=\{UE_{p6}\}$ and $N_{SB}(t)=\{SB1, SB2, SB3\}$. It is also assumed that in the initial cell scheduling, i.e., the first-step operation of the algorithm, the optimization problem $P_2$ is performed at TTI(t) based on Equation (3) and the outcomes are A={{0, 1, 1}}$_{(u \times n)}$ and B={{0,1,0,0,0}}$_{(u \times j)}$, where $J_{max}=5$. This means that the pico cell 30-6 UE is scheduled for SB2 and SB3 with a MCS index of 2.

For the pico cell 30-7, it is assumed that at TTI(t), the UE space denoted by U(t), the maximum MCS index set denoted by $\{j_{u,max}(x_{u,n})|u \in U(t), n \in N_{SB}(t)\}$ and each SB taken from the resource space denoted by $N_{SB}(t)$ are given, where $U(t)=\{UE_{p7}\}$ and $N_{SB}(t)=\{SB1, SB2, SB3, SB4, SB5\}$. It is also assumed that in the initial cell scheduling, i.e., the first-step operation of the algorithm, the optimization problem $P_2$ is performed at TTI(t) based on Equation (3) and the outcomes are A={{0, 0, 1, 1, 1}}$_{(u \times n)}$ and B={{0,1,0,0,0}}$_{(u \times j)}$, where $J_{max}=5$. This means that the pico cell 30-7 UE is scheduled for SB3, SB4, and SB5 with a MCS index of 2.

For the pico cell 30-8, it is assumed that at TTI(t), the UE space denoted by U(t), the maximum MCS index set denoted by $\{j_{u,max}(x_{u,n})|u \in U(t), n \in N_{SB}(t)\}$ and each SB taken from the resource space denoted by $N_{SB}(t)$ are given, where $U(t)=\{UE_{p8}\}$ and $N_{SB}(t)=\{SB1, SB2, SB3, SB4, SB5\}$. It is also assumed that in the initial cell scheduling, i.e., the first-step operation of the algorithm, the optimization problem $P_2$ is performed at TTI(t) based on Equation (3) and the outcomes are A={{0, 1, 1, 1, 0}}$_{(u \times n)}$ and B={{0,0,1,0,0}}$_{(u \times j)}$, where $J_{max}=5$. This means that the pico cell 30-8 UE is scheduled for SB2, SB3, and SB4 with a MCS index of 3.

From the above discussion, the cell cluster 36-0, the cell cluster 36-3, and the cell cluster 36-4 are formed in the coverage of the macro cell 24-2. The cell cluster 36-0 only contains the macro UE 34-15 (UEm1 in FIG. 8), which is only associated with the macro cell 24-2. It is scheduled by the macro cell 24-2 for SB1 with a MCS index of 4 at TTI(t). It is clear that this is a non-DL CoMP case and the scheduling is degenerated to the conventional single cell scheduling. Thus, no more operation is needed for the cell cluster 36-0 from the scheduling perspective.

Figure 8:
FIG. 8 illustrates a second example of the DL CoMP scheduling procedure of FIGS. 4A and 4B according to some embodiments of the present disclosure.

The cell cluster 36-3 includes the macro UE 34-16 (UEm2 in FIG. 8) and the UE 34-14 (UEm1) as well as the pico UE 34-5 (UEp5 in FIG. 8) and the pico UE 34-6 (UEp6 in FIG. 8). It is a three-dimensional cell cluster 36 associated with the macro cell 24-2, the pico cell 30-5, and the pico cell 30-6. The scheduling result is that the macro UE 34-16 is scheduled by the macro cell 24-2 for SB2 with a MCS index of 2; the macro UE 34-14 is not scheduled; the pico UE 34-5 is scheduled by the pico cell 30-5 for SB1 and SB2 with a MCS index of 3; and the pico UE 34-6 is scheduled by the pico cell 30-6 for SB2 and SB3 with a MCS index of 2. Thus, SB2 is common for the three scheduled UEs 34 in this cell cluster 36. According to the algorithm given earlier, the three scheduled UEs 34 use the same JP/JT DL CoMP scheme for transmission of their data on the SB2. On the SB1, however, the pico UE 34-5 cannot be scheduled for this SB for transmission because the transmission made by the macro cell 24-2 to the macro UE 34-15, will interfere with the transmission to the pico UE 34-5 on SB1. The same situation occurs for the pico UE 34-6 on SB3. As a result, the allocation of SB1 for the pico UE 34-5 and SB3 for the pico UE 34-6 are dropped as shown in FIG. 8.

The cell cluster 36-4 includes the macro UE 34-17 (UEm4 in FIG. 8) as well as the pico UE 34-7 (UEp7 in FIG. 8) and the pico UE 34-8 (UEp8 in FIG. 8). It is also a three-dimensional cell cluster 36 associated with the macro cell 24-2, the pico cell 30-7, and the pico cell 30-8. The scheduling result is that the macro UE 34-17 is scheduled by the macro cell 24-2 for SB3 with a MCS index of 4; the pico UE 34-7 is scheduled by the pico cell 30-7 for SB3, SB4 and SB5 with a MCS index of 2; and the pico UE 34-8 is scheduled by the pico cell 30-8 for SB2, SB3, and SB4 with a MCS index of 3. Thus, the SB3 is common for all three scheduled UEs 34 of this cell cluster 36-4 and the SB4 is common only for the pico UE 34-7 and the pico UE 34-8. According to the algorithm given above, the three scheduled UE 34-17, UE 34-7, and UE 34-8 use the same JP/JT DL CoMP scheme simultaneously for transmission of their data on the SB3, and the pico UE 34-7 and the pico UE 34-8 but excluding the macro UE 34-17 use the same JP/JT DL CoMP scheme simultaneously for transmission of their data on the SB4. On SB5, however, the pico UE 34-7 uses CS/CB scheme to transmit its own data. However, for the pico cell 30-8, the pico downlink 46 scheduler detects a scheduling conflict with the macro cell 24-2 on SB2 and subsequently drops this SB for transmission to the pico UE 34-8.

In summary, by applying the disclosed DL CoMP schedule scheme, the inter-cell co-channel interference for UEs 34 in each cell cluster 36 is substantially reduced and, in some embodiments, eliminated with the ideal DL CoMP schemes. In addition to that, it also allows mixed JP/JT and Co/CB transmissions in a cell cluster 36 whenever possible. All of this will greatly increase downlink throughputs for each involved cell 24, 30 and UE 34. Finally, readers may notice that in order to resolve scheduling conflicts between associated macro and pico cells 24 and 30, another alternative handling is to allow some SBs dropped and reallocated to any cell-center UEs 34.

Figure 9:
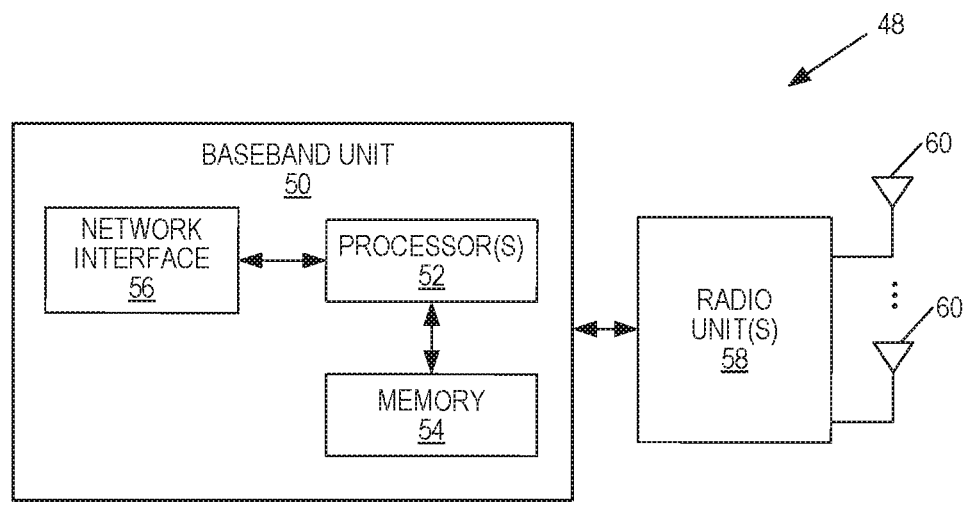
FIG. 9 is a block diagram of a base station according to some embodiments of the present disclosure.

FIG. 9 is a block diagram of a base station 48 according to one embodiment of the present disclosure. The base station 48 may be, for example, the macro eNB 26 and associated transmission nodes 28 of FIG. 2 or one of the pico eNBs 32 of FIG. 2. As illustrated, the base station 48 includes a baseband unit 50 including one or more processors 52 (e.g., Central Processing Units (CPUs), Application Specific Integrated Circuits (ASICs), and/or Field Programmable Gate Arrays (FPGAs)), memory 54, and a network interface 56 as well as one or more radio units 58 coupled to one or more antennas 60. With respect to the macro eNB 26, in some embodiments, the eNB level and macro level coordinators 38 and 40 as well as the macro downlink schedulers 42 are implemented in software stored in, e.g., the memory 54 for execution by the processor(s) 52. Likewise, with respect to the pico eNB 32, in some embodiments, the pico level coordinator 44 as well as the pico downlink scheduler 46 is implemented in software stored in, e.g., the memory 54 for execution by the processor(s) 52. Notably, in some embodiments, circuitry containing the processor(s) 52 and, in some embodiments, the memory 54 operates to execute software whereby the base station 48 operates as described herein.

Figure 10:
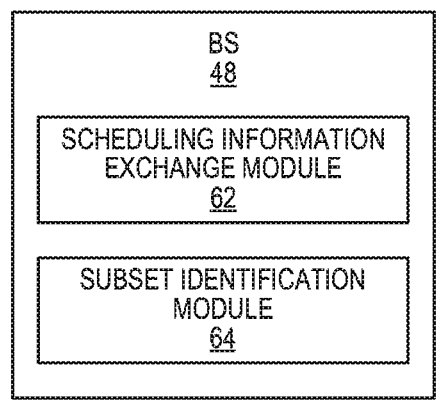
FIG. 10 is a block diagram of a base station according to some other embodiments of the present disclosure.

In one embodiment, a computer program including instructions which, when executed by at least one processor, causes the at least one processor to carry out the DL CoMP scheme according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 54). FIG. 10 illustrates the base station 48 according to some other embodiments of the present disclosure. As illustrated, the base station 48 includes a scheduling information exchange module 62 and a subset identification module 64, each of which is implemented in software. The scheduling information exchange module 62 operates to exchange scheduling information with the other base stations 24, 30 via an appropriate network interface(s) of the base station 48 (not illustrated) according to any of the embodiments described herein. The subset identification module 64 operates to identify different subset of SBs for the different downlink CoMP transmission modes according to any of the embodiments described herein. While not illustrated, the base station 48 may include additional modules that perform the other functionality of the base stations 24, 30 described herein. For example, the base station 48 may include an initial downlink scheduling module operative to perform initial downlink scheduling, as described above.

In some embodiments, the base station 48 controlling one of the cells 24, 30 in a cell cluster 36 includes the scheduling information exchange module 62, where the scheduling exchange module 62 is operative to exchange scheduling information with the one or more other cells 24, 30 comprised in the cell cluster 30 for downlink CoMP via a network interface (not shown) of the base station 48. Exchanging the scheduling information includes sending, to the one or more other cells 24, 30 in the cell cluster 36 for downlink CoMP, scheduling information that is indicative of resource blocks from a defined set of resource blocks that are scheduled, by initial downlink scheduling, for one or more wireless devices 34 that are connected to the cell 24, 30 and associated with the cell cluster 36 for downlink CoMP over a transmit time interval. Exchanging the scheduling information also includes receiving, from each other cell 24, 30 in the cell cluster 36 for downlink CoMP, scheduling information that is indicative of resource blocks from the defined set of resource blocks that are scheduled, by initial downlink scheduling, for one or more other wireless devices 34 that are connected to the other cell 24, 30 and associated with the cell cluster 36 for downlink CoMP over the transmit time interval. The base station 48 also include the subset identification module 64 that is operative to identify a first subset of the defined set of resource blocks for a first downlink CoMP transmission mode and a second subset of the defined set of resource blocks for a second downlink CoMP transmission mode based on the scheduling information, the first and second subsets being disjoint subsets.

As discussed above, embodiments of a distributed DL CoMP scheduling scheme are disclosed. However, it should be noted that, in some alternative embodiments, the DL CoMP scheduling scheme disclosed herein can be performed in a centralized manner (i.e., by a centralized node) instead of in a distributed manner (i.e., by the various cells 24, 30 in the cluster in a distributed or cooperative manner).

The following acronyms are used throughout this disclosure.

3GPP 3rd Generation Partnership Project
ASIC Application Specific Integrated Circuit
CB Coordinated Beamforming
CoMP Coordinated Multipoint
CPU Central Processing Unit
CQI Channel Quality Indicator
CS Coordinated Scheduling
DCS Dynamic Cell Selection
DL Downlink
eNB Enhanced or Evolved Node B
FD Frequency Domain
FPGA Field Programmable Gate Array
IE Information Element
JP Joint Processing
JT Joint Transmission
LTE Long Term Evolution
MAC Media Access Controller
MCS Modulation and Coding Scheme
ms Millisecond
OFDM Orthogonal Frequency Division Multiple Access
QoS Quality of Service
RSRP Reference Signal Received Power
SB Scheduling Block
SI Scheduling Information
SINR Signal-to-Interference-plus-Noise Ratio
TD Time Domain
TR Technical Report
TTI Transmit Time Interval
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a cell scheduler for a cell, the cell scheduler used in a cellular communications network to enable downlink Coordinated Multipoint, CoMP, scheduling for a cell cluster comprising the cell and one or more other cells, comprising:
   sending, to the one or more other cells in the cell cluster for downlink CoMP, scheduling information that is indicative of resource blocks from a defined set of resource blocks that are scheduled, by initial downlink scheduling, for one or more wireless devices that are connected to the cell and associated with the cell cluster for downlink CoMP over a transmit time interval;
   receiving, from each other cell in the cell cluster for downlink CoMP, scheduling information that is indicative of resource blocks from the defined set of resource blocks that are scheduled, by initial downlink scheduling, for one or more other wireless devices that are connected to the other cell and associated with the cell cluster for downlink CoMP over the transmit time interval; and
   identifying a first subset of the defined set of resource blocks for a first downlink CoMP transmission mode and a second subset of the defined set of resource blocks for a second downlink CoMP transmission mode based on the scheduling information, the first and second subsets being disjoint subsets.

2. The method of claim 1 wherein the first downlink CoMP transmission mode is a Joint Processing/Joint Transmission, JP/JT, transmission mode and the second downlink CoMP transmission mode is a Coordinated Scheduling/Coordinated Beamforming, CS/CB, transmission mode.

3. The method of claim 2 wherein identifying the first subset of the defined set of resource blocks for the first downlink CoMP transmission mode and the second subset of the defined set of resource blocks for the second downlink CoMP transmission mode comprises, for each resource block from the defined set of resource blocks that is scheduled by the initial downlink scheduling for the one or more wireless devices that are connected to the cell and associated with the cell cluster for downlink CoMP:
   identifying the resource block as one of the first subset of the defined set of resource blocks if the resource block is also scheduled, by the initial downlink scheduling, for at least one wireless device that is connected to at least one of the one or more other cells in the cell cluster as indicated by the scheduling information.

4. The method of claim 2 wherein identifying the first subset of the defined set of resource blocks for the first downlink CoMP transmission mode and the second subset of the defined set of resource blocks for the second downlink CoMP transmission mode further comprises, for each resource block from the defined set of resource blocks that is scheduled by the initial downlink scheduling for the one or more wireless devices that are connected to the cell and associated with the cell cluster for downlink CoMP:
   identifying the resource block as one of the second subset of the defined set of resource blocks if the resource block is not also scheduled, by the initial downlink scheduling, for any wireless device that is connected to any of the one or more other cells in the cell cluster as indicated by the scheduling information.

5. The method of claim 2 wherein:
   the cell is a small cell;
   the one or more other cells in the cell cluster for downlink CoMP comprise a macro cell that is also comprised in another, overlapping cell cluster for downlink CoMP; and
   identifying the first subset of the defined set of resource blocks for the first downlink CoMP transmission mode and the second subset of the defined set of resource blocks for the second downlink CoMP transmission mode further comprises removing, from the first and second subsets of the defined set of resource blocks, any resource block that is also scheduled for one or more wireless devices connected to the macro cell and associated with the other, overlapping cell cluster for downlink CoMP.

6. The method of claim 2 wherein the first subset of the defined set of resource blocks comprises one or more of the defined set of resource blocks that are scheduled for wireless devices that are connected to and associated with two or more cells in the cell cluster.

7. The method of claim 2 wherein:
   the cell is a small cell;
   the one or more other cells in the cell cluster for downlink CoMP comprise a macro cell that is also comprised in another, overlapping cell cluster for downlink CoMP; and
   the first subset of the defined set of resource blocks comprises one or more of the defined set of resource blocks that: (a) are scheduled for wireless devices that are connected to and associated with two or more cells in the cell cluster and (b) are not also scheduled for one or more wireless devices connected to the macro cell and associated with the other, overlapping cell cluster for downlink CoMP.

8. The method of claim 2 wherein:
the cell is a small cell;
the one or more other cells in the cell cluster for downlink CoMP comprise a macro cell that is also comprised in another, overlapping cell cluster for downlink CoMP; and
the second subset of the defined set of resource blocks comprises one or more of the defined set of resource blocks that: (a) are not scheduled, by the initial downlink scheduling, for any wireless device that is connected to any of the one or more other cells in the cell cluster as indicated by the scheduling information and (b) are not scheduled for one or more wireless devices connected to the macro cell and associated with the other, overlapping cell cluster for downlink CoMP.

9. The method of claim 1 wherein:
the cell is a small cell;
the one or more other cells in the cell cluster for downlink CoMP comprise a macro cell that is also comprised in another, overlapping cell cluster for downlink CoMP; and
any resource block from the defined set of scheduling resource blocks that is neither comprised in the first subset nor the second subset of the defined set of scheduling resource blocks, is not scheduled in the small cell for any wireless device connected to the small cell and associated with the cell cluster.

10. The method of claim 1 further comprising, for each wireless device of the one or more wireless devices connected to the cell and associated with the cell cluster for downlink CoMP:
setting a downlink CoMP transmission mode for the wireless device to the first downlink CoMP transmission mode for the resource blocks in the first subset of the defined set of resource blocks; and
setting the downlink CoMP transmission mode for the wireless device to the second downlink CoMP transmission mode for the resource blocks in the second subset of the defined set of resource blocks.

11. The method of claim 1 wherein:
the cell is a small cell;
the one or more other cells in the cell cluster for downlink CoMP comprise a macro cell that is also comprised in another, overlapping cell cluster for downlink CoMP; and
the method further comprises scheduling one or more resource blocks from the defined set of resource blocks that are neither in the first subset nor the second subset of the defined set of resource blocks for one or more wireless devices that are connected to the small cell but are not associated with the cell cluster.

12. The method of claim 1 wherein the cell is a macro cell.

13. The method of claim 1 wherein the cell is a pico cell.

14. The method of claim 1 further comprising performing the initial downlink scheduling for the cell according to a proportional fair scheduling scheme.

15. The method of claim 1 further comprising performing the initial downlink scheduling for the cell according to a modified maximum throughput scheduling scheme, the modified maximum throughput scheduling scheme being that in which throughput is maximized across the one or more wireless devices that are connected to the cell and associated with the cell cluster and the defined set of resource blocks available to the cell cluster.

16. The method of claim 1 wherein the cell is a macro cell where the macro cell is comprised in the cell cluster and another, overlapping cell cluster for downlink CoMP, and the method further comprises performing the steps of exchanging scheduling information and identifying the first subset and the second subset of the defined set of resource blocks for the other, overlapping cell cluster.

17. The method of claim 1 wherein the cellular communications network is a heterogeneous cellular communications network, and the cell cluster consists of only pico cells.

18. The method of claim 1 wherein the cellular communications network is a heterogeneous cellular communications network, and at least two of the cells and the one or more other cells are macro cells.

19. A base station of a cell of a cellular communications network, the base station operating to provide distributed downlink Coordinated Multipoint, CoMP, scheduling for a cell cluster comprising the cell and one or more other cells, comprising:
at least one radio unit;
at least one network interface;
at least one processor; and
memory containing software instructions executable by the at least one processor whereby the base station is operative to:
send, to the one or more other cells in the cell cluster for downlink CoMP, scheduling information that is indicative of resource blocks from a defined set of resource blocks that are scheduled, by initial downlink scheduling, for one or more wireless devices that are connected to the cell and associated with the cell cluster for downlink CoMP over a transmit time interval;
receive, from each other cell of the one or more other cells comprised in the cell cluster for downlink CoMP, scheduling information that is indicative of resource blocks from the defined set of resource blocks that are scheduled, by initial downlink scheduling, for one or more other wireless devices that are connected to the other cell and associated with the cell cluster for downlink CoMP over the transmit time interval; and
identify a first subset of the defined set of resource blocks for a first downlink CoMP transmission mode and a second subset of the defined set of resource blocks for a second downlink CoMP transmission mode based on the scheduling information, the first and second subsets of the defined set of resource blocks being disjoint subsets.

20. The base station of claim 19 wherein the first downlink CoMP transmission mode is a Joint Processing/Joint Transmission, JP/JT, transmission mode and the second downlink CoMP transmission mode is a Coordinated Scheduling/Coordinated Beamforming, CS/CB, transmission mode.

21. The base station of claim 20 wherein, in order to identify the first subset of the defined set of resource blocks for the first downlink CoMP transmission mode and the second subset of the defined set of resource blocks for the second downlink CoMP transmission mode, the base station is further operative to, for each resource block from the defined set of resource blocks that is scheduled by the initial downlink scheduling for the one or more wireless devices that are connected to the cell and associated with the cell cluster for downlink CoMP:
identify the resource block as one of the first subset of the defined set of resource blocks if the resource block is also scheduled, by the initial downlink scheduling, for at least one wireless device that is connected to at least one of the one or more other cells in the cell cluster as indicated by the scheduling information.

22. The base station of claim 20 wherein, in order to identify the first subset of the defined set of resource blocks for the first downlink CoMP transmission mode and the second subset of the defined set of resource blocks for the second downlink CoMP transmission mode, the base station is further operative to, for each resource block from the defined set of resource blocks that is scheduled by the initial downlink scheduling for the one or more wireless devices that are connected to the cell and associated with the cell cluster for downlink CoMP:
identify the resource block as one of the second subset of the defined set of resource blocks if the resource block is not also scheduled, by the initial downlink scheduling, for any wireless device that is connected to any of the one or more other cells in the cell cluster as indicated by the scheduling information.

23. The base station of claim 20 wherein:
the cell is a small cell;
the one or more other cells in the cell cluster for downlink CoMP comprise a macro cell that is also comprised in another, overlapping cell cluster for downlink CoMP; and
in order to identify the first subset of the defined set of resource blocks for the first downlink CoMP transmission mode and the second subset of the defined set of resource blocks for the second downlink CoMP transmission mode, the base station is further operative to remove, from the first and second subsets of the defined set of resource blocks, any resource block that is also scheduled for one or more wireless devices connected to the macro cell and associated with the other, overlapping cell cluster for downlink CoMP.

24. The base station of claim 20 wherein the first subset of the defined set of resource blocks comprises one or more of the defined set of resource blocks that are scheduled for wireless devices that are connected to and associated with two or more cells in the cell cluster.

25. The base station of claim 20 wherein:
the cell is a small cell;
the one or more other cells in the cell cluster for downlink CoMP comprise a macro cell that is also comprised in another, overlapping cell cluster for downlink CoMP; and
the first subset of the defined set of resource blocks comprises one or more of the defined set of resource blocks that: (a) are scheduled for wireless devices that are connected to and associated with two or more cells in the cell cluster and (b) are not also scheduled for one or more wireless devices connected to the macro cell and associated with the other, overlapping cell cluster for downlink CoMP.

26. The base station of claim 20 wherein:
the cell is a small cell;
the one or more other cells in the cell cluster for downlink CoMP comprise a macro cell that is also comprised in another, overlapping cell cluster for downlink CoMP; and
the second subset of the defined set of resource blocks comprises one or more of the defined set of resource blocks that: (a) are not scheduled, by the initial downlink scheduling, for any wireless device that is connected to any of the one or more other cells in the cell cluster as indicated by the scheduling information and (b) are not scheduled for one or more wireless devices connected to the macro cell and associated with the other, overlapping cell cluster for downlink CoMP.

27. The base station of claim 19 wherein:
the cell is a small cell;
the one or more other cells in the cell cluster for downlink CoMP comprise a macro cell that is also comprised in another, overlapping cell cluster for downlink CoMP; and
any resource block from the defined set of scheduling resource blocks that is neither comprised in the first subset nor the second subset of the defined set of scheduling resource blocks, is not scheduled in the small cell for any wireless device connected to the small cell and associated with the cell cluster.

28. The base station of claim 19 wherein the base station is further operative to, for each wireless device of the one or more wireless devices connected to the cell and associated with the cell cluster for downlink CoMP:
set a downlink CoMP transmission mode for the wireless device to the first downlink CoMP transmission mode for the resource blocks in the first subset of the defined set of resource blocks; and
set the downlink CoMP transmission mode for the wireless device to the second downlink CoMP transmission mode for the resource blocks in the second subset of the defined set of resource blocks.

29. The base station of claim 19 wherein:
the cell is a small cell;
the one or more other cells in the cell cluster for downlink CoMP comprise a macro cell that is also comprised in another, overlapping cell cluster for downlink CoMP; and
the base station is further operative to schedule one or more resource blocks from the defined set of resource blocks that are neither in the first subset nor the second subset of the defined set of resource blocks for one or more wireless devices that are connected to the small cell but are not associated with the cell cluster.

30. The base station of claim 19 wherein the cell is a macro cell.

31. The base station of claim 19 wherein the cell is a pico cell.

* * * * *